United States Patent
Criscuolo et al.

(10) Patent No.: US 11,074,065 B2
(45) Date of Patent: Jul. 27, 2021

(54) RULE-BASED DYNAMIC COMMAND TRIGGERS IN MOBILE APPLICATIONS

(71) Applicant: salesforce.com, inc., San Francisco, CA (US)

(72) Inventors: Brian Matthew Criscuolo, Charleston, SC (US); William Gail Mote, II, Charleston, SC (US); Seth Clark, Charlotte, NC (US); Jeff Sylvia, Hagerstown, IN (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/706,322

(22) Filed: Dec. 6, 2019

(65) Prior Publication Data

US 2021/0173633 A1   Jun. 10, 2021

(51) Int. Cl.
*G06F 9/44*    (2018.01)
*G06F 8/656*   (2018.01)
*G06Q 30/00*   (2012.01)

(52) U.S. Cl.
CPC ............ *G06F 8/656* (2018.02); *G06Q 30/01* (2013.01)

(58) Field of Classification Search
CPC ......... G06F 8/656; G06F 11/00; G06Q 30/00; G06Q 30/01
USPC .................................................. 717/100, 173
See application file for complete search history.

(56) References Cited

U.S. PATENT DOCUMENTS

| 10,305,758 | B1* | 5/2019 | Bhide | H04L 41/147 |
| 2009/0247077 | A1* | 10/2009 | Sklovsky | G06F 9/445 455/41.1 |
| 2012/0260344 | A1* | 10/2012 | Maor | C07K 14/47 726/25 |
| 2014/0165204 | A1* | 6/2014 | Williams | H04L 63/02 726/25 |
| 2015/0201313 | A1* | 7/2015 | Celik | H04W 4/12 455/414.1 |
| 2017/0017634 | A1* | 1/2017 | Levine | G06T 11/60 |
| 2018/0032997 | A1* | 2/2018 | Gordon | G06Q 30/0269 |

(Continued)

OTHER PUBLICATIONS

Trigger management mechanisms ; Author:: TJ Makela, published on 2007.*

(Continued)

*Primary Examiner* — Chameli Das
(74) *Attorney, Agent, or Firm* — Holland & Hart LLP

(57) ABSTRACT

Methods, systems, and devices for data processing at a software development kit running in a mobile device are described. A software development kit may receive, from a mobile application running on the mobile device, a logged event indication in response to an event occurring within the mobile application. The software development kit download, from an application server and before receiving the logged event indication, a data payload including a set of triggers, a set of rules associated with the set of triggers, and a set of processing commands associated with the set of rules. The software development kit may then identify the received logged event indication as a trigger from the set of triggers, evaluate a rule associated with the trigger based on the identifying, and process a processing command associated with the rule, where the processing command includes utilizing native code of the mobile application.

18 Claims, 12 Drawing Sheets

(56) References Cited

U.S. PATENT DOCUMENTS

2019/0213064 A1* 7/2019 Baier .................. H04L 12/2814

OTHER PUBLICATIONS

Panappticon: Event-based tracing to measure mobile application and platform performance, author: L Zhang et al, published on 2013.*

Mobile phone sensing systems: A survey; WZ Khan et al, published on 2012; Resource: IEEE.*

* cited by examiner

US 11,074,065 B2

RULE-BASED DYNAMIC COMMAND TRIGGERS IN MOBILE APPLICATIONS

FIELD OF TECHNOLOGY

The present disclosure relates generally to database systems and data processing, and more specifically to rule-based dynamic command triggers in mobile applications.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Mobile applications generally provide for hardcoded coupling between the actions that a user takes in the mobile application and marketing outcomes defined by a marketing platform. Thus, developing marketing materials for mobile applications often entail collaboration between application developer and marketer. Current techniques for hardcoded coupling between user actions and marketing outcomes limits the ability to perform targeted marketing or to dynamically update the marketing behavior. Specifically, current mobile applications lack the ability to dynamically update marketing outcomes based on user behavior within a mobile application.

DETAILED DESCRIPTION

Figure 1:
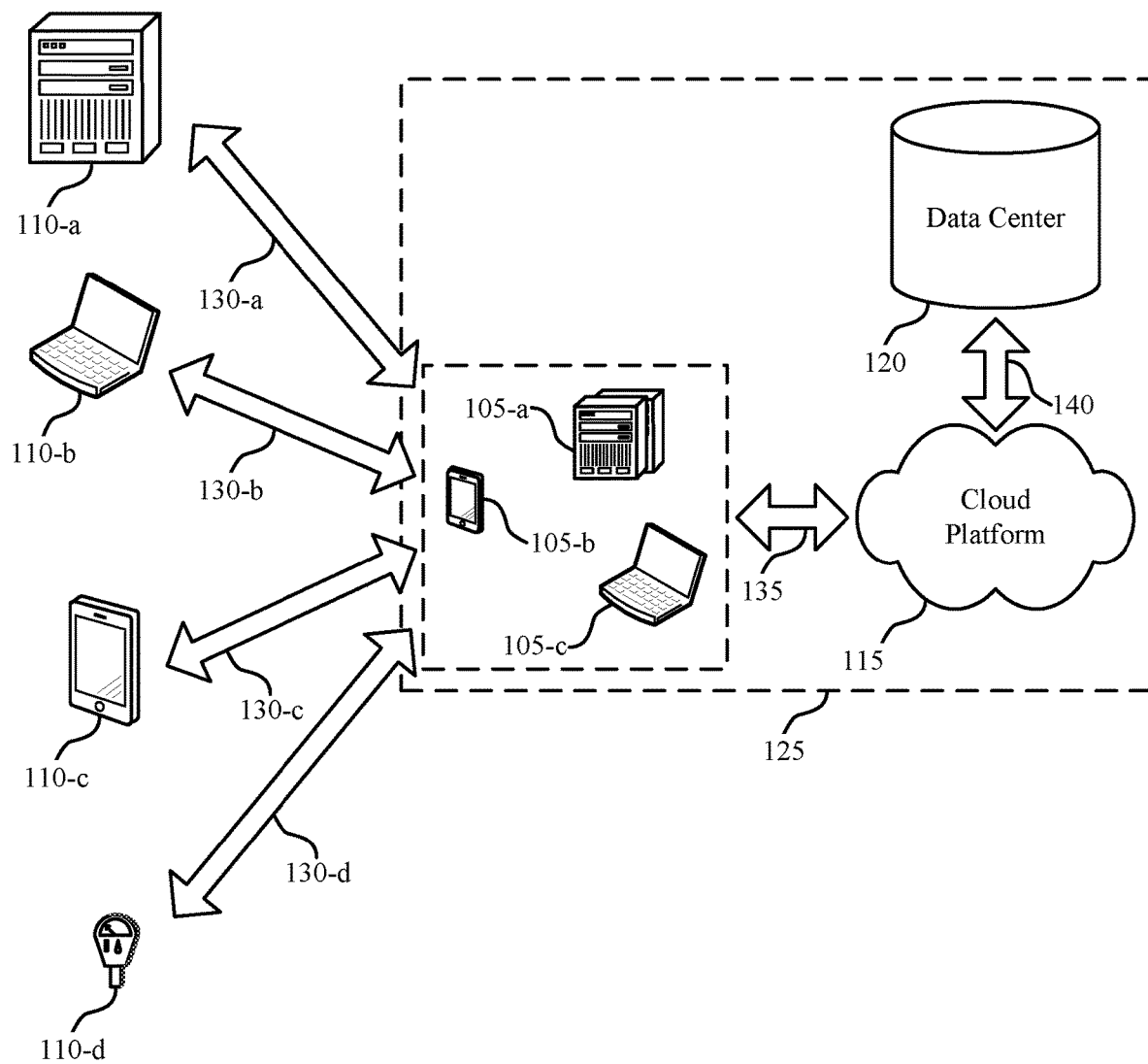
FIG. 1 illustrates an example of a system for data processing at a software development kit running in a mobile device that supports rule-based dynamic command triggers in mobile applications in accordance with aspects of the present disclosure.

Mobile applications may receive user inputs and may be able to provide marketing contents based on the received user input. Specifically, a marketer (such as, an advertiser), targeting a user of a mobile application, intends to provide a single (or a set) of outcomes in response to a particular user action within a mobile application. For example, the marketer may design the outcomes such that an action of opening the application may result in a first outcome, an action of arriving at a retail store may result in a second outcome, an action of tapping a button within the mobile application may result in a third outcome, an action of achieving a level in a game may result in a fourth outcome, and so on. Generally, outcomes may include one or more of displaying a message, logging analytics, triggering alternate application behavior, calling a web-based service, or a combination thereof. Conventionally, when developing in-app marketing materials for mobile applications, there exists a hardcoded coupling between actions that a user takes in the mobile application and the marketing outcomes defined by a marketing platform. In traditional marketing models, a marketer may work in collaboration with an application developer to agree upon and encode action-to-outcome pairings within the mobile application. In some examples, the action-to-outcome pairings may include pairings of user actions to specific outcomes. For instance, the marketer in collaboration with the application developer may encode that a particular outcome is to be generated when a user of a mobile application presses a button. Additionally, the marketer in collaboration with the application developer may encode that another outcome is to be generated when a user of a mobile application adds an item to a shopping cart (e.g., when an item valued greater than 10.99 is added to a virtual shopping cart within the mobile application, the outcome may include calling a specific web-based application programming interface (API)).

Conventionally, developing in-app marketing materials for mobile applications thus requires coupling between the actions that a user takes in the mobile application and the marketing outcomes (such as, defined by a marketer). This coupling is static and hardcoded into the mobile application itself. As a result, the application developer and the marketer works together to make any changes to the application code in current marketing systems. Because of the hardcoded coupling, the action-to-outcome pairings are often created during application development, and are static in time until the application developer and marketer (i.e., the application developer and the marketer in collaboration) change the implementation and release an update to the mobile application. In some implementations, even with a released update, users of the mobile application, who do not upgrade the mobile application will still have the old method in place. This hardcoded coupling limits the ability to perform targeted marketing or to dynamically update the marketing behavior, because the same rules are hardcoded into the application that everyone uses.

Furthermore, the coupling between the application behavior and the marketing outcomes restricts the traditional marketing model (after development of the mobile application) to target the outcomes to a specific segment of the users. According to existing systems, all users are enabled for the same rules during the time when the mobile application was developed. Additionally, traditional methods of targeted marketing present a number of challenges as the marketing system for mobile applications do not allow for dynamic targeting of marketing engagement based on usage, campaigns or shifting demographics and user behaviors. In conventional marketing systems, a marketer may not be able to create multiple outcomes dependent on dynamic target demographics (specifically, when the business logic and outcomes are encoded statically within the mobile application code). In some instances, marketing automation systems designed for native mobile application engagement do not support such a model, and rather rely on a one-to-one mapping of application action to outcome. Therefore, complex and dynamic automations cannot be achieved in traditional marketing systems without a tight integration between marketer and developer. Moreover, the current scale of mobile usage (i.e., millions of individuals using millions of devices) poses a challenge to the traditional, customized marketing programs. Specifically, individual customer attention from marketer is diluted in traditional marketing programs due to the increasing scale of target audience.

According to one or more aspects of the present disclosure, the methods described herein provide for marketers to utilize preexisting or customizable actions within a mobile application (such as, "app open," "geofence event," "user interaction," etc.), and be enabled to configure the outcomes independent of the application development. Thus, the methods described herein avoid hardcoding the outcomes within a mobile application. Additionally or alternatively, a marketer may utilize the techniques described herein to establish a system of dynamic outcomes tied to an action within a mobile application. The marketer may also be able to evaluate using a system of rules and ordering, and may encode multiple complex outcomes based on a single in-application action and current application data. Specifically, the present disclosure provides for effective, relevant, and user-centric marketing without increasing the scale of the marketing resources available to the business.

In some implementations, the current disclosure proposes a marketing software development kit (SDK) that is installed on a mobile device and embedded within a mobile application. The marketing SDK acts as an interface between the native code of the mobile application and the server-side marketing platform. In some instances, the marketing SDK may enable the mobile application to display in-application messages that are not hardcoded into the mobile application. In some examples, the marketing SDK in collaboration with the application server may be configured to implement a solution where a general application event (e.g., a user action or some other pre-defined trigger) may cause a server-defined marketing rules to be validated, leading to one or more outcomes to occur. A marketing SDK may include an embeddable library of code provided by a vendor of the marketing system. The marketing SDK may implement a business logic, include a user interface, and a callable public interface (e.g., an API) through which a marketing solution is enabled.

As described herein, the marketing SDK may receive, from the mobile application running on the mobile device, a logged event indication in response to an event occurring within the mobile application. For example, a mobile application may log events occurring within the mobile application (e.g., item added to cart) and may issue an API call to the marketing SDK (e.g., "logEvent( ))") indicating the logged event. In some cases, a marketer, independent of application developer, may create one or more marketing campaigns on a marketing automation system server (or an application server described herein). The marketer may establish a trigger and a set of outcomes in response to the trigger. In some cases, the trigger and the set of outcomes may be based on one or more events at the mobile application (e.g., past logged event or future events or both). In some examples, the marketer may define the trigger and the set of outcomes which happens in response to a validation a set of rules. In some examples, the set of rules may include conditions by which the logged event (i.e., application-side event) validates a marketer-defined criteria to determine whether at least one of the set of outcomes should be executed.

In some examples, the marketing SDK may download, from the marketing platform, triggers, rules that are evaluated in response to the triggers, and outcomes that occur if the rules are evaluated as true. For example, the marketing SDK may download, from an application server and before receiving the logged event indication, a data payload including a set of triggers, a set of rules associated with the set of triggers, and a set of processing commands associated with the set of rules. In some cases, the marketing SDK may store the triggers, rules and outcomes downloaded from the application server. In some implementations, the marketing SDK may periodically, or in response to a notification by the application server, download marketing trigger data from the application server. These server-defined rules can be configured after the mobile application has been developed and installed on the mobile device, thereby providing the flexibility that the previous systems lack.

In some instances, the marketing SDK may identify whether the logged event can be categorized as a trigger. If the marketing SDK detects a trigger (e.g., a logged event), the marketing SDK then evaluates a rule (e.g., checks the shopping cart amount and customer status), and processes an outcome (e.g., display an in-app message) based on the evaluation of the rule. For example, the marketing SDK identifies the received logged event indication as a trigger from the set of triggers and evaluates a rule associated with the trigger from the set of rules based on the identifying. In some cases, the marketing SDK may process a processing command associated with the rule from the set of processing commands based on the rule. In some cases, the processing command includes utilizing native code of the mobile application.

Additionally or alternatively, the marketing SDK may receive a second logged event (e.g., application open event) prior to identifying the trigger. The marketing SDK may identify that the second logged event does not include a trigger, and may monitor the mobile application for further logged events upon determining that the second logged event does not include a trigger. The marketing SDK may also identify one or more parameters associated with the trigger. For example, the marketing SDK may evaluate multiple parameters (such as product parameters, cart count parameters, etc.) to determine if the rule is satisfied. The marketing may determine that the rule is satisfied based on determining that the one or more parameters satisfy the rule.

Aspects of the disclosure are initially described in the context of an environment supporting an on-demand database service. Aspects of the disclosure are further described with respect to an data processing system, outcome generation processes, and a process flow diagram. Aspects of the disclosure are further illustrated by and described with reference to apparatus diagrams, system diagrams, and flowcharts that relate to rule-based dynamic command triggers in mobile applications.

FIG. 1 illustrates an example of a system 100 for cloud computing that supports rule-based dynamic command triggers in mobile applications in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may be an example of a database system including multiple interconnected databases, data stores, or any other types of data storage systems. The application server 105-a may be a marketing server and the contacts 110 (such as mobile devices 110-c) may include a marketing SDK and may host a mobile application. Although described with reference to a mobile application, it may be understood that the application may be hosted in a contact which is not a mobile device and is capable of including an application. According to one or more aspects of the present disclosure, the contact 110 (such as, a mobile device 110-c) may include a mobile application installed within the contact 110. In some examples, the contact 110 may further include a marketing SDK. In some cases, the marketing SDK may be embedded within the mobile application.

The marketing SDK may act as the interface between the native code of the mobile application and the server-side marketing platform, which enables the mobile application to display in-app messages that are not hardcoded into the mobile application. In some examples, the marketing SDK may receive, from a mobile application running on the mobile device (such as, contact 110), a logged event indication in response to an event occurring within the mobile application. For example, the mobile application may log events occurring within the mobile application (e.g., item added to cart) and may issue an API call to the marketing SDK (e.g., "logEvent( )") indicating the logged event.

In some implementations, the marketing SDK may download, from an application server (e.g., application server 105) and before receiving the logged event indication, a data payload including a set of triggers, a set of rules associated with the set of triggers, and a set of processing commands associated with the set of rules. Alternatively, the marketing SDK may download the data payload after receiving the logged event indication. In some examples, the trigger may define an overall metadata associated with a triggering mechanism. The trigger may include a unique identifier and a key indicating the logged event. In some cases, the set of rules associated with the set of triggers may include an array of rules, and the set of processing commands associated with the set of rules may include an array of outcomes. As depicted herein, the data payload may partially or entirely be defined at the application server (or marketing server, such as application server 105). The server-defined rules can be configured after the mobile application has been developed and installed on the mobile device, thereby providing the flexibility that the previous systems lack.

In some examples, the marketing SDK may detect a trigger (e.g., a logged event), evaluate a rule (e.g., checks the shopping cart amount and customer status), and process an outcome (e.g., display an in-application message) based on the evaluation of the rule. For example, the marketing SDK running in the mobile device (such as, contact 110-c) may identify the received logged event indication as a trigger from the set of triggers, evaluate a rule associated with the trigger from the set of rules based on the identifying, and processes a processing command associated with the rule from the set of processing commands based on the rule. In some examples, the processing command may include utilizing native code of the mobile application.

In some other marketing systems, while developing in-app marketing materials for mobile applications, there exists a hardcoded coupling between actions that a user takes in the mobile application and the marketing outcomes defined by a marketing platform. Conventional marketing applications may provide for a marketer to work in collaboration with an application developer to agree upon and encode action-to-outcome pairings within the mobile application. That is, the hardcoded coupling between the actions that a user takes in the mobile application and the marketing outcomes defined by a marketing platform is static and hardcoded into the mobile application itself and requires the application developer and the marketer to work together to make changes to the application code. This hardcoded coupling limits the ability to perform targeted marketing or to dynamically update the marketing behavior. In some examples, mobile applications may receive user inputs and a marketer (such as, an advertiser), targeting a user of a mobile application, intends to provide a single (or a set) of outcomes in response to a particular user action within a mobile application. In other marketing systems, the action-to-outcome pairings are often hardcoded and are static in time until the application developer and marketer change the implementation and release an update to the mobile application. Additionally, the conventional marketing systems lacks the ability to dynamically update the marketing behavior, because the same rules are hardcoded into the application provided to all users. Thus, a robust process for marketing may be needed to effectively provide dynamic marketing materials to users of a mobile application.

According to one or more aspects of the present disclosure, the system 100 may provide one or more techniques for data processing at a marketing SDK running in a mobile device that improves the efficiency of a marketing process. The method described herein provides for marketers to utilize preexisting actions within a mobile application to provide the users with targeted marketing content. In some examples, the marketers may configure outcomes of a logged event within a mobile application independent of the application development. According to some implementations, the SDK that is installed on the mobile device (such as, contact 110) and embedded within a mobile application installed in the mobile device, enables the mobile application to provide outcomes (e.g., display messages) that are not hardcoded into the mobile application.

As depicted herein, the SDK running in a contact 110 may interact with a mobile application installed within the contact 110. In some examples, the SDK may act as a "bridge" between an application server (or marketing server) and the mobile application. In some cases, the SDK may provide outcomes to the mobile application without interacting with the native code of the mobile application. The mobile application may periodically log events based on user interactions with the mobile application. The mobile application may then transmit a logged event indication to the SDK. Upon receiving the logged event indication, the SDK may download a data payload from the application server. Alternatively, the SDK may download the data payload before receiving the logged event from the mobile application. In some examples, the data payload may include a set of triggers, a set of rules associated with the set of triggers, and a set of processing commands associated with the set of rules.

Upon receiving the logged event, the SDK may determine whether the logged event may be identified as a trigger. In some examples, if the logged event is identified as a trigger, the SDK may evaluate a rule associated with the trigger. A rule may define a set of values for used for comparison with input from the mobile application (or client of the marketing SDK). In some examples, the rules may be ordered to establish a sequencing of evaluation by the SDK. Additionally or alternatively, the rules may be configured to support Boolean logic evaluation to achieve more complex evaluation results. Accordingly, the rules may be configured to support various value types (such as, integer, double, Boolean, string) for comparison with the input (such as, logged event indication or trigger or both) received from the mobile application. Additionally, the rules may support value operators (such as, equal, not equal, less than, greater than, less than or equal, greater than or equal, regex) for comparison with the input (such as, logged event indication or trigger or both) received from the mobile application. In some cases, the SDK may process an outcome (or a processing command) associated with the rule based on the rule. For example, the SDK may enable the mobile application to provide an outcome to a user based on the rule. In some implementations, an outcome (or processing command) may be defined as a response to the positive (i.e. "true") evaluation of rule The outcomes may be unordered, and if the SDK determines a positive result for each rule of a set of rules, then the SDK may enable the mobile application to perform all outcomes. In some examples, the outcomes may be typed (e.g., inputted by a marketer in the application server-side), and may provide context to marketing SDK. Additionally or alternatively, one or more outcomes from a set of outcomes may be outcomes may be independent from one another.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
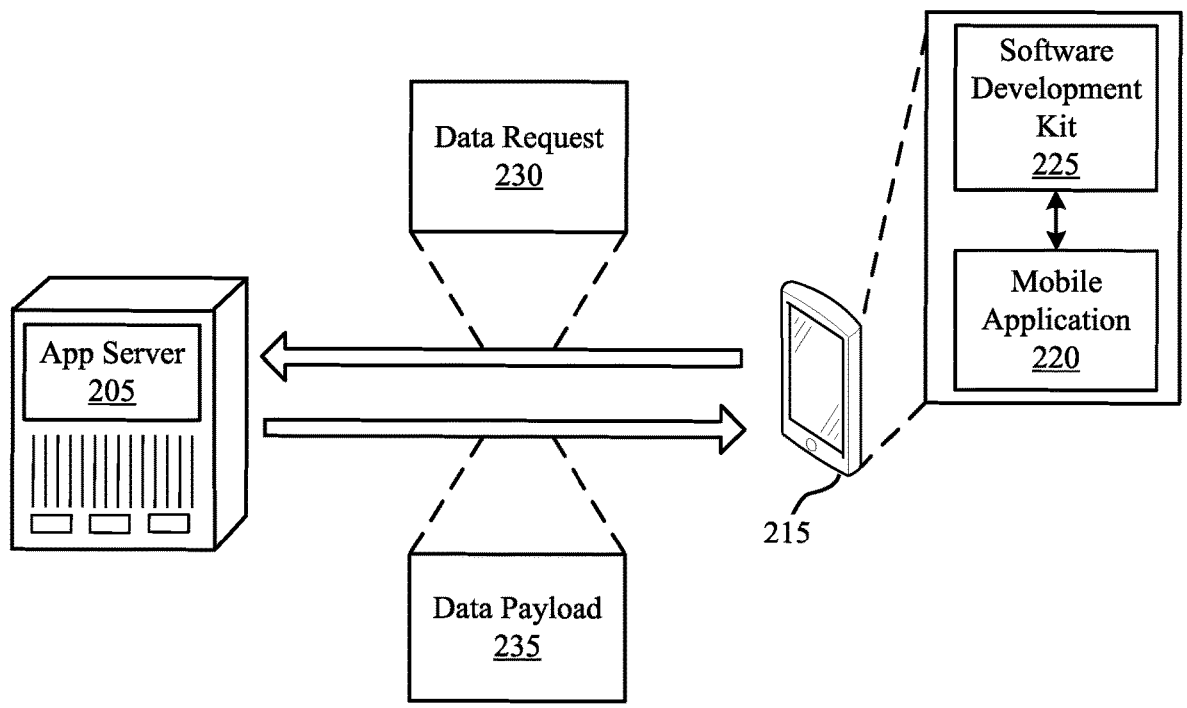
FIG. 2 illustrates an example of a system that supports rule-based dynamic command triggers in mobile applications in accordance with aspects of the present disclosure.

FIG. 2 illustrates an example of a system 200 that supports rule-based dynamic command triggers in mobile applications in accordance with aspects of the present disclosure. The system 200 may include an application server 205 (e.g., a server including a marketing platform), a and a user device 215. The application server 205 may be an example of a cloud-based server, a server cluster, a virtual machine, a container, or any other device supporting a marketing application. In some cases, the functions performed by the application server 205 may instead be performed by a component of the user device 215, or vice versa. The user device 215 may host one or more mobile applications 220 and a marketing SDK 225. The user device 215 may further support data processing at the SDK 225, to enable the mobile application 220 to provide one or more outcomes. Specifically, the user device 215 in combination with the application server 205 may support a technique where the SDK 225 may enable the mobile application 220 to display in-app messages that are not hardcoded into the mobile application 220. A user operating the user device 215 may interact with the mobile application 220, and may receive displayed messages based on the interactions. In some cases, the displayed messages may be generated at the application server 205 and are not statically encoded into the mobile application 220. In some examples, the displayed messaged may be dynamically encoded into the application server 205 by a process defined by a creator associated with the mobile application 220. In some examples, the user device 215 in combination with the application server 205 may support a technique where the SDK 225 processes a processing command associated with a rule. As depicted herein, the processing command (or outcomes) may include utilizing native code of the mobile application 220.

According to one or more aspects, the user device 215 may display an interface (e.g., a user interface) supporting viewing and interaction with one or more applications by the user operating the user device 215. In some cases, the user device 215 may include an SDK 225 and a mobile application 220. According to one or more aspects of the present disclosure, a user operating the user device 215 may be able to view the mobile application 220 installed at the user device 215. In one example, the user operating the user device 215 may be associated with a user credential or user ID, and the user may log on to the user device 215 using the user credential. In some cases, the user may also log on to the mobile application 220 using a user credential. Although a single user device 215 is depicted herein, it may be understood that multiple user devices 215 may be able to simultaneously display the mobile application 220. In some cases, a user (such as a client associated with a particular knowledge domain in a multi-tenant system) may utilize the user device 215 to log on to the mobile application 220. In some examples, this mobile application 220 may be displayed (on user device 215) as a webpage within a web browser (e.g., as a software as a service (SaaS) product). In other examples, this mobile application 220 may be part of an application downloaded onto the user device 215. The mobile application 220 may support real-time updates and other embedded applications and/or displays.

In some examples, the user operating the user device 215 may be able to interact with (e.g., provide inputs to) the mobile application 220 installed at the user device 215. In some examples, the user device 215 may receive a user input (such as a user input to the mobile application 220) and the user device 215 may log the user input. In some cases, the mobile application 220 may categorize each logged input at the mobile application 220 as a logged event. In some examples, the SDK 225 may receive a logged event indication from the mobile application 220. The SDK may receive an API call in response to the event occurring within the mobile application 220, where the API call includes the logged event indication. In some examples, the SDK 225 may receive, from the mobile application 220 running on the user device 215, a second logged event indication prior to receiving the logged event indication. The SDK 225 may identify that the second logged event indication does not include the trigger from the set of triggers. For example, the SDK 225 may determine that the second logged event indication does not map to at least a trigger. In some examples, upon identifying that the second logged event indication is not identified as a trigger, the SDK 225 may monitor the mobile application 220 running on the user device 215 for further logged event indications. In some examples, the SDK 225 may monitor the mobile application 220 to identify the events occurring within the mobile application 220.

According to some implementations, the SDK 225 may download (e.g., in response to a data request 230) a data payload 235 from the application server 205, prior to receiving the logged event. In some examples, the SDK 225 may download a data payload 235 from the application server 205, after receiving the logged event. In some examples, the data payload 235 may include a set of triggers, a set of rules associated with the set of triggers, and a set of processing commands associated with the set of rules. In some cases, the SDK 225 may store the data payload 235 downloaded from the application server 205. In some examples, the set of triggers, the set of rules associated with the set of triggers, and the set of processing commands associated with the set of rules may not be statically encoded into the mobile application, the set of triggers, the set of rules associated with the set of triggers. In some cases, the set of processing commands associated with the set of rules may be dynamically encoded into the application server by a creator associated with the mobile application.

In some cases, the logged event indication may be an API call from the mobile application 220. For example, the mobile application 220 may call a "logEvent( )" API at the SDK 225. Upon receiving the logged event indication, a business logic for rule-based marketing engagement triggers is executed at the SDK 225. For instance, the SDK 225 may identify the logged event as a trigger. In one or more examples, the SDK may determine whether the indication of a logged event (such as a name of a logged event) "logEvent( )" maps to a key associated with a trigger. In one example, the SDK 225 may determine that the indication of the logged event maps to the trigger. In such cases, if trigger exists in the data payload 235 (e.g., marketing automation system data downloaded from the application server 205), the SDK 225 may be configured to validate the trigger. For instance, the SDK may extract one or more rules associated with the trigger and may process the rules in order to evaluate whether the rules are satisfied.

In some cases, the SDK 225 may identify one or more parameters associated with the trigger, and may evaluate the rule associated with the trigger by determining that the one or more parameters satisfy the rule. In one example, the SDK 225 may apply one or more values associated with the mobile application 220 to the logged event (such as, "logEvent( )"). In other words, the SDK 225 may evaluate a rule associated with the trigger based on identifying the received logged event indication as a trigger from the set of triggers. In some examples, the SDK 225 may apply system values (such as, application lifecycle, application version, OS version, etc.) in order to evaluate rules against the received inputs. If all rules return "true," (e.g., a positive result), then the SDK 225 may extract outcomes (or processing commands) from trigger. The SDK 225 may additionally apply the outcomes (or processing commands) to the mobile application 220. For example, the SDK 225 may process a processing command associated with the rule from the set of processing commands based on the rule. In some examples, the processing command may include outcomes which utilize native code of the mobile application 220. In some cases, the outcome may include displaying a message on the mobile application 220. For example, the SDK 225 may transmit, for display within the mobile application 220 running on the user device 215, a message. In one example, the outcome may include the SDK 225 transmitting a request for a uniform resource locator (URL) including one or more parameters associated with the trigger. In one example the one or more parameters associated with the trigger may include at least one of an identifier associated with the mobile application 220, an identifier associated with the received logged event indication, or a combination thereof. Additionally or alternatively, the outcome may include the SDK 225 in collaboration with the mobile application 220 opening a webpage associated with the mobile application 220 based on the rule.

In some examples, the SDK 225 may determine that a second event has occurred within the mobile application 220 after occurrence of the logged event. That is, the SDK 225 may be configured to process multiple logged events and generate a unique or common outcome to each of the multiple logged events. In some cases, the SDK 225 may forward the second logged event indication to the application server 205 based on receiving the second logged event indication. In one example, the SDK 225 may transmit, to the application server 205, a request 230 to update the data payload 235 based on determining that a second event has occurred within the mobile application 220. In some examples, the second event may include identifying a use of a feature included in the mobile application 220. In response to the request 230 for additional information, the SDK 225 may receive additional information from at least one of the mobile application 220, the user device 215, the application server 205, or a combination thereof. In some cases, the SDK 225 may then evaluate the rule associated with the trigger based on the additional information.

Figure 3:
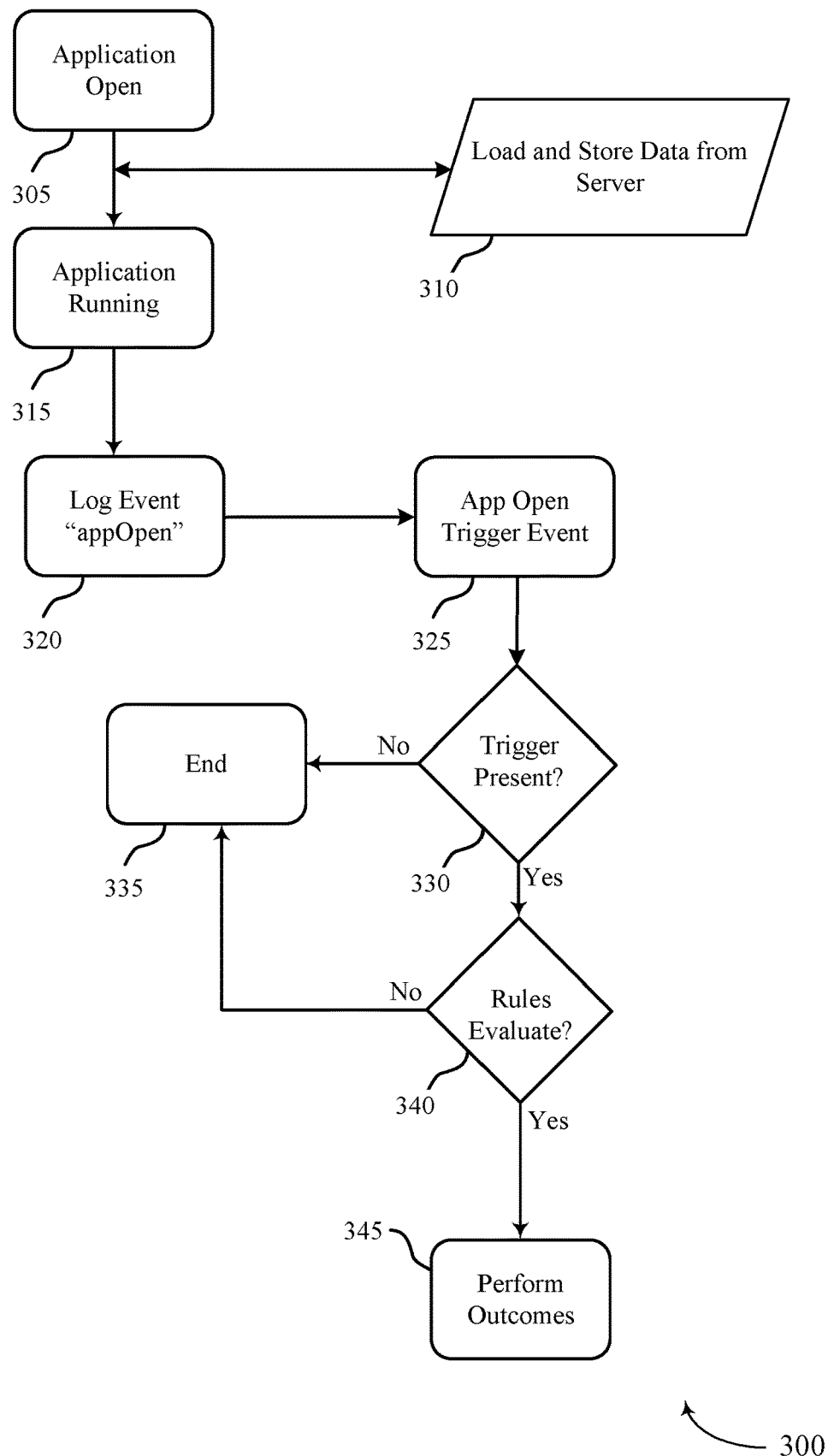
FIG. 3 illustrates an example of a data processing procedure that supports rule-based dynamic command triggers in mobile applications in accordance with aspects of the present disclosure.

FIG. 3 illustrates an example of a data processing procedure 300 that supports rule-based dynamic command triggers in mobile applications in accordance with aspects of the present disclosure. As previously described with reference to FIG. 2, the data processing procedure 300 may be implemented using a mobile device which may be an example of a user device 215 as described with reference to FIG. 2. In some examples, the data processing procedure 300 may be implemented using a mobile device in combination with an application server which may be an example of an application server 205 as described with reference to FIG. 2.

In some implementations, the data processing procedure 300 may include a stream of events. The mobile device may include a mobile application installed within the mobile device, and an SDK (such as a marketing SDK). As depicted herein, the SDK may act as the interface between the native code of the mobile application and a server-side marketing platform (residing on the application server), which enables the mobile application to display in-application messages that are not hardcoded into the mobile application.

At 305, the mobile application may detect that the mobile application has been opened (or accessed) by a user. At 310, the SDK may load and store data received from an application server. For example, the SDK may download, from the application server and before receiving any logged event indication, a data payload. In some examples, the data payload may include a set of triggers, a set of rules associated with the set of triggers, and a set of processing commands associated with the set of rules. Additionally, the SDK may store the data payload downloaded from the application server.

At 315, the mobile application may detect that the mobile application is running. For example, the mobile application may detect that the mobile application has been accessed for a duration which is more than a threshold period of time. At 320, the mobile application may log an event "appOpen" based on detecting that the mobile application is running. Upon detecting access of the mobile application and logging the event, the mobile application may indicate the logged event to the SDK. At 325, the SDK may receive, from the mobile application running on the mobile device, a logged event indication in response to an event (e.g., "appOpen") occurring within the mobile application.

At 330, the SDK may determine whether a trigger is present within the logged event indication. In some instances, the SDK may identify the received logged event indication as a trigger from the set of triggers. If the SDK determines that a trigger is absent, or if the logged event cannot be identified as a trigger, then the process ends at 335. On the other hand, if the SDK determines that a trigger is present or if logged event can be identified as a trigger, then at 340, the SDK may evaluate one or more rules associated with the trigger from the set of rules based on the identifying. If the SDK evaluates at least one of the one or more rules to be false, then the process ends at 335. If the SDK evaluates the one or more rules to be true, then at 345, SDK performs one or more outcomes associated with the one or more rules. For example, the SDK may process a processing command associated with the rule from the set of processing commands based on the rule. As depicted herein, the processing command (or outcomes) may include utilizing native code of the mobile application. That is, the SDK may utilize the native code of the mobile application to display a message and/or perform additional tasks in response to a positive evaluation of the rules at 340.

Figure 4:
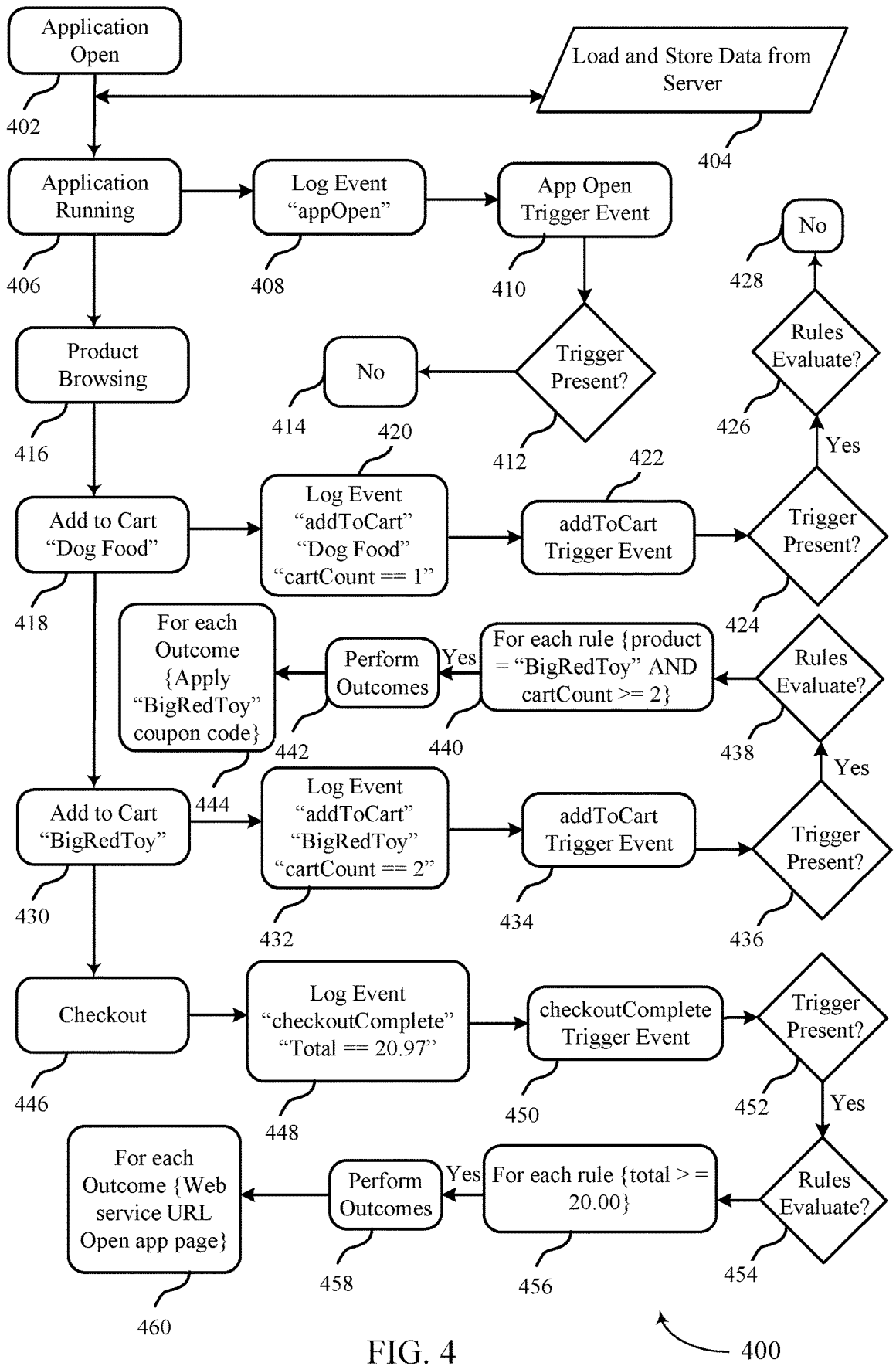
FIG. 4 illustrates an example of a data processing procedure that supports rule-based dynamic command triggers in mobile applications in accordance with aspects of the present disclosure.

FIG. 4 illustrates an example of a data processing procedure 400 that supports rule-based dynamic command triggers in mobile applications in accordance with aspects of the present disclosure. The data processing procedure 400 may be implemented using a mobile device which may be an example of a user device 215 as described with reference to FIG. 2. In some examples, the data processing procedure 400 may be implemented using a mobile device in combination with an application server which may be an example of an application server 205 as described with reference to FIG. 2.

As depicted herein, the data processing procedure 400 may include a stream of events. The mobile device may include a mobile application installed within the mobile device, and an SDK (such as a marketing SDK). The SDK may include an embeddable library of code, provided by a vendor of a marketing automation system (such as, a market system residing in an application server), and implementing business logics, a user interface, and APIs. In other words, the SDK acts as the interface between the native code of the mobile application and the application server, which enables the mobile application to perform outcomes that are not hardcoded into the mobile application.

At 402, the mobile application may detect that the mobile application has been opened (or accessed) by a user. At 404, the SDK may load and store data received from an application server. For example, the SDK may download, from the application server and before receiving any logged event indication, a data payload. In some examples, the data payload may include a set of triggers, a set of rules associated with the set of triggers, and a set of processing commands associated with the set of rules. Additionally, the SDK may store the data payload downloaded from the application server. At 406, the mobile application may detect that the mobile application is running. At 408, the mobile application may log an event "appOpen" based on detecting that the mobile application is running. At 410, the SDK may receive, from the mobile application running on the mobile device, a logged event indication in response to an event (e.g., "appOpen") occurring within the mobile application. At 412, the SDK may determine whether a trigger is present within the logged event indication (i.e., within "appOpen" logged event). In the example of FIG. 4, the SDK may determine that trigger isn't present in the logged event indication. Upon determining that the trigger is absent, or if the SDK fails to identify the logged event as a trigger, then the process ends at 414.

At 416, the mobile application may detect that a user is browsing one or more products within the mobile application. At 418, the mobile application may log an event based on detecting that the browsing within the mobile application. For example, the event may indicate that the user has added dog food to a cart. At 420, the SDK may receive, from the mobile application running on the mobile device, a logged event indication in response to an event (e.g., "addToCart") occurring within the mobile application. In the example of FIG. 4, the logged event may indicate "addToCart" "dog food" and "cartCount==1" parameters. At 422, the SDK may determine whether a trigger is present within the logged event indication (i.e., within "addToCart" logged event). At 424, the SDK may identify the received logged event indication as a trigger from the set of triggers. If the SDK determines that a trigger is absent, or if the logged event cannot be identified as a trigger, then the process ends (not shown). If the SDK determines that a trigger is present or if logged event can be identified as a trigger, then at 426, the SDK may evaluate one or more rules associated with the trigger from the set of rules based on the identifying. If the SDK evaluates at least one of the one or more rules to be false, then the process ends at 428.

At 430, the mobile application may log an event based on detecting that the browsing within the mobile application. For example, the event may indicate that the user has added a big red toy to a cart. In one example, the cart may already include dog food when the big red toy is added. At 432, the SDK may receive, from the mobile application running on the mobile device, a logged event indication in response to an event (e.g., "addToCart") occurring within the mobile application. The logged event may indicate "addToCart" "BigRedToy" and "cartCount==2" parameters. At 434, the SDK may determine whether a trigger is present within the logged event indication (i.e., within "addToCart" logged event). At 436, the SDK may identify the received logged event indication as a trigger from the set of triggers. Upon determining that a trigger is present, at 438, the SDK may evaluate one or more rules associated with the trigger from the set of rules. At 440, the SDK evaluates one or more parameters associated with a rule. For example, the SDK evaluates a product parameter (e.g., "product=BigRedToy") and a cart count parameter ("cartCount >=2"). If the SDK evaluates at least one of the one or more rules to be false, then the process ends (not shown). If the SDK evaluates the one or more rules to be true, then at 442, SDK performs one or more outcomes associated with the one or more rules. For example, the SDK may process a processing command associated with the rule from the set of processing commands based on the rule. As depicted at 444, the SDK may apply a coupon code (e.g., apply "BigRedToy" coupon code) for each outcome.

At 446, the mobile application may log an event based on detecting an event at the mobile application (such as, a checkout event). At 448, the SDK may receive, from the mobile application running on the mobile device, a logged event indication in response to an event (e.g., "checkoutComplete" event) occurring within the mobile application. The logged event may indicate "checkoutComplete" and "Total==20.97" parameters. At 450, the SDK may determine whether a trigger is present within the logged event indication. At 452, the SDK may identify the received logged event indication as a trigger from the set of triggers. Upon determining that a trigger is present, at 454, the SDK may evaluate one or more rules associated with the trigger from the set of rules. At 456, the SDK evaluates one or more parameters associated with a rule. For example, the SDK evaluates a total parameter (e.g., "total?=20.00"). If the SDK evaluates at least one of the one or more rules to be false, then the process ends (not shown). If the SDK evaluates the one or more rules to be true, then at 458, SDK performs one or more outcomes associated with the one or more rules. At 460, the SDK may open an application page (e.g., web service URL, open application page) for each outcome.

Figure 5:
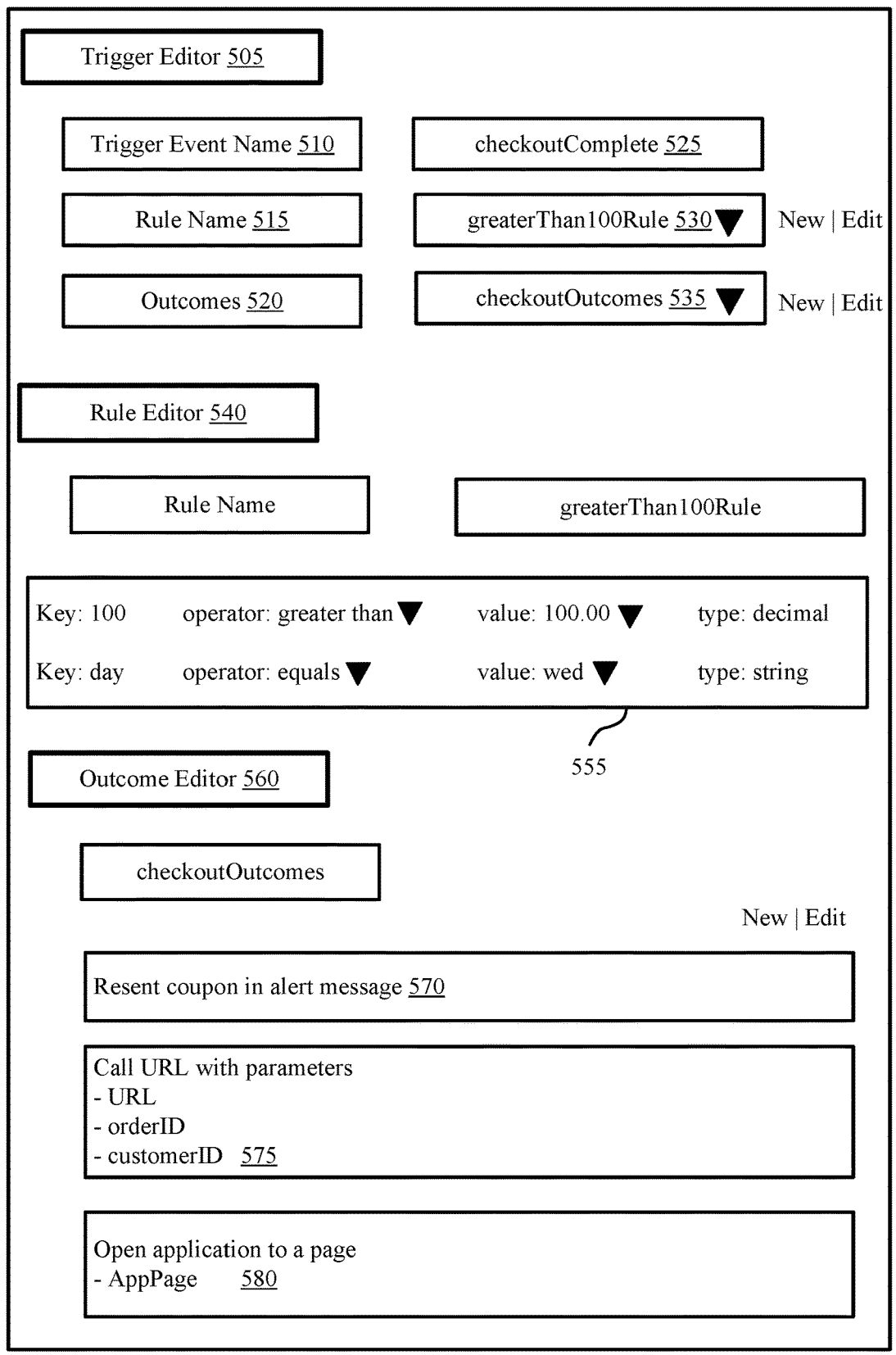
FIG. 5 illustrates an example of an interface that supports rule-based dynamic command triggers in mobile applications in accordance with aspects of the present disclosure.

FIG. 5 illustrates an example of an interface 500 that supports rule-based dynamic command triggers in mobile applications in accordance with aspects of the present disclosure. The interface 500 may be implemented using an application server which may be an example of an application server 205 as described with reference to FIG. 2. The techniques of data processing described herein may be implemented using a mobile device in combination with the application server. The mobile device may be an example of a user device 215 as described with reference to FIG. 2.

In some implementations, a mobile device may include a mobile application installed within the mobile device, and an SDK (such as a marketing SDK). The SDK may include an embeddable library of code, provided by a vendor of a marketing automation system (such as, a market system residing in an application server). The SDK may be embedded within the mobile application, and may act as the interface between the native code of the mobile application and the server-side marketing platform, which enables the mobile application to display in-application messages that are not hardcoded into the mobile application. In some examples, the SDK may be able to provide other outcomes in response to evaluation of a rule from a set of rules. In some examples, marketers may be able to define a set of triggers, a set of rules associated with the set of triggers, and a set of processing commands (or outcomes) associated with the set of rules in the application server. In some examples, the marketers may be able to define the set of triggers, the set of rules, and the set of processing commands using the interface 500.

In some examples, the interface 500 may be displayed as an interface in the application server, and may enable marketers to create and update triggers, rules, and outcomes independent of the mobile application. The interface 500 thus provides for a marketers to perform targeted marketing or to dynamically update the marketing behavior associated with a mobile application. As depicted herein, the interface 500 may include a trigger editor 505, a rule editor 540, and an outcome editor 560. The trigger editor 505 may include multiple trigger parameters, the rule editor 540 may include multiple rule parameters, and the outcome editor 560 may include multiple outcome parameters.

In some examples, the trigger parameters include trigger event name 510, the rule parameters include a rule name 515, and the outcomes parameters include outcomes 520. In the example of FIG. 5, the trigger event name 510 is described as checkoutComplete 525, the rule name 515 is described as greaterThan100Rule 530, and the outcomes 520 is described as checkoutOutcomes 535. In some cases, a user (e.g., a marketer) may be able to add, delete or update the triggers, rules, and outcomes (e.g., using the trigger editor 505, the rule editor 540, and/or the outcome editor 560). In some examples, the parameters 555 of the greaterThan100Rule 530 rule is further displayed in interface 500. For example, the parameters of the greaterThan100Rule 530 rule may include a key (such as "date," "100," etc.), an operator (such as, "greater than," "equals," etc.), a value (such as, "100.00," "wed," etc.) and a type (such as, "decimal," "string," etc.). As described with reference to FIG. 5, an SDK running in a mobile device may evaluate a rule to be true is a value of a checkout is more than 100.00 and if the day is a Wednesday.

In some examples, the outcomes 570, 575, and 580 of the checkoutOutcomes 535 rule are further displayed in interface 500. In one example, the outcome 570 of the checkoutOutcomes 535 rule may include resending a coupon in an alert message. The outcome 575 of the checkoutOutcomes 535 rule may include transmitting a request for a URL including one or more parameters (such as, order identifier, user identifier, etc.). Furthermore, the outcome 580 of the checkoutOutcomes 535 rule may include opening the mobile application in a webpage. According to one or more aspects of the present disclosure, the SDK may download a data payload from the application server, and may utilize the data payload to provide outcomes at the mobile application.

Figure 6:
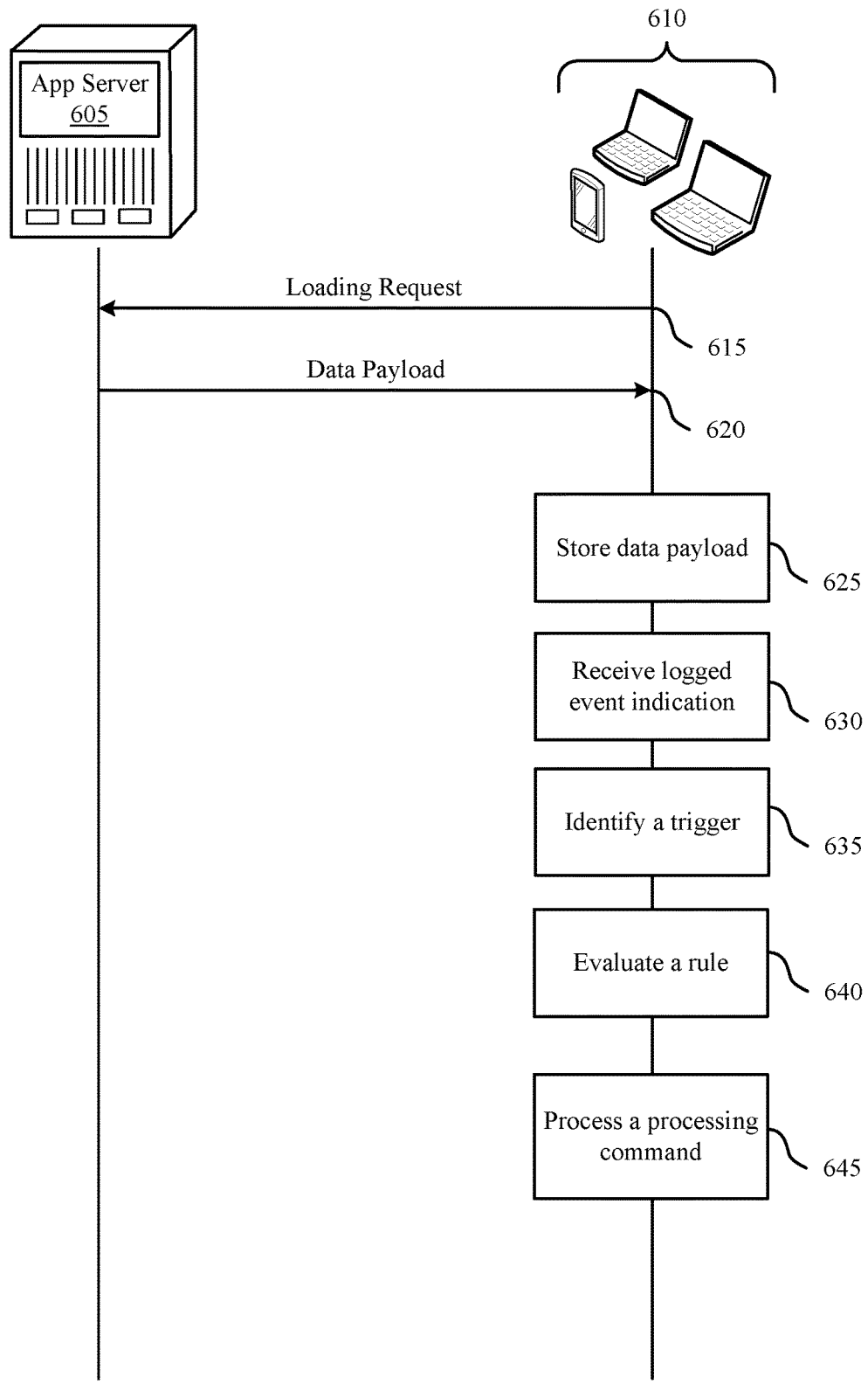
FIG. 6 illustrates an example of a process flow that supports rule-based dynamic command triggers in mobile applications in accordance with aspects of the present disclosure.

FIG. 6 illustrates an example of a process flow 600 that supports rule-based dynamic command triggers in mobile applications in accordance with aspects of the present disclosure. The process flow 600 may involve an application server 605 or some other device for hosting a marketing application (for example, a marketing server accessed by marketers for providing targeted marketing content), and user devices 610, which may be examples of the corresponding devices described with reference to FIGS. 1 through 5. Although depicted as a server, it may be understood that the application server may be a user device. In some cases, some or all of the functionality of the application server 605 may be performed by components of the user devices 610, and vice versa. The application server 605 and the user devices 610 may implement a number of techniques to build and process rule-based dynamic command triggers. Alternative examples of the following may be implemented, where some steps are performed in a different order than described or are not performed at all. In some cases, steps may include additional features not mentioned below, or further steps may be added.

The application server 605 may store triggers, rules that are evaluated in response to the triggers, and outcomes that occur if the rules are evaluated as true. At 615, an SDK running in a user device 610 may transmit, to the application server 605, a request for a data payload. In some examples, the request for the data payload may be in response to an user activity (such as, open a mobile application installed on the user device 610) within the user device 610. At 620, the user device 610 may receive, from the application server 605, the requested data payload. In some examples, the data payload may include a set of triggers, a set of rules associated with the set of triggers, and a set of processing commands associated with the set of rules. In some cases, the set of triggers, the set of rules associated with the set of triggers, and the set of processing commands associated with the set of rules are not statically encoded into the mobile application. In some cases, the set of triggers, the set of rules associated with the set of triggers, and the set of processing commands associated with the set of rules are dynamically encoded into the application server by a creator associated with the mobile application.

At 625, the SDK running in the user device 610, may store the data payload downloaded from the application server 605. At 630, the SDK running in the user device 610, may receive, from a mobile application running on the user device 610, a logged event indication in response to an event occurring within the mobile application.

At 635, the SDK may identify the received logged event indication as a trigger from the set of triggers. At 640, the SDK may evaluate a rule associated with the trigger from the set of rules based on the identifying the received logged event indication as the trigger. For example, the SDK (e.g., SDK running in the user device 610) may identify one or more parameters associated with the trigger, where evaluating the rule associated with the trigger comprises determining that the one or more parameters satisfy the rule. At 645, the SDK running in the user device 610, may process a processing command associated with the rule from the set of processing commands based on the rule. In some cases, the processing command include utilizing native code of the mobile application.

Figure 7:
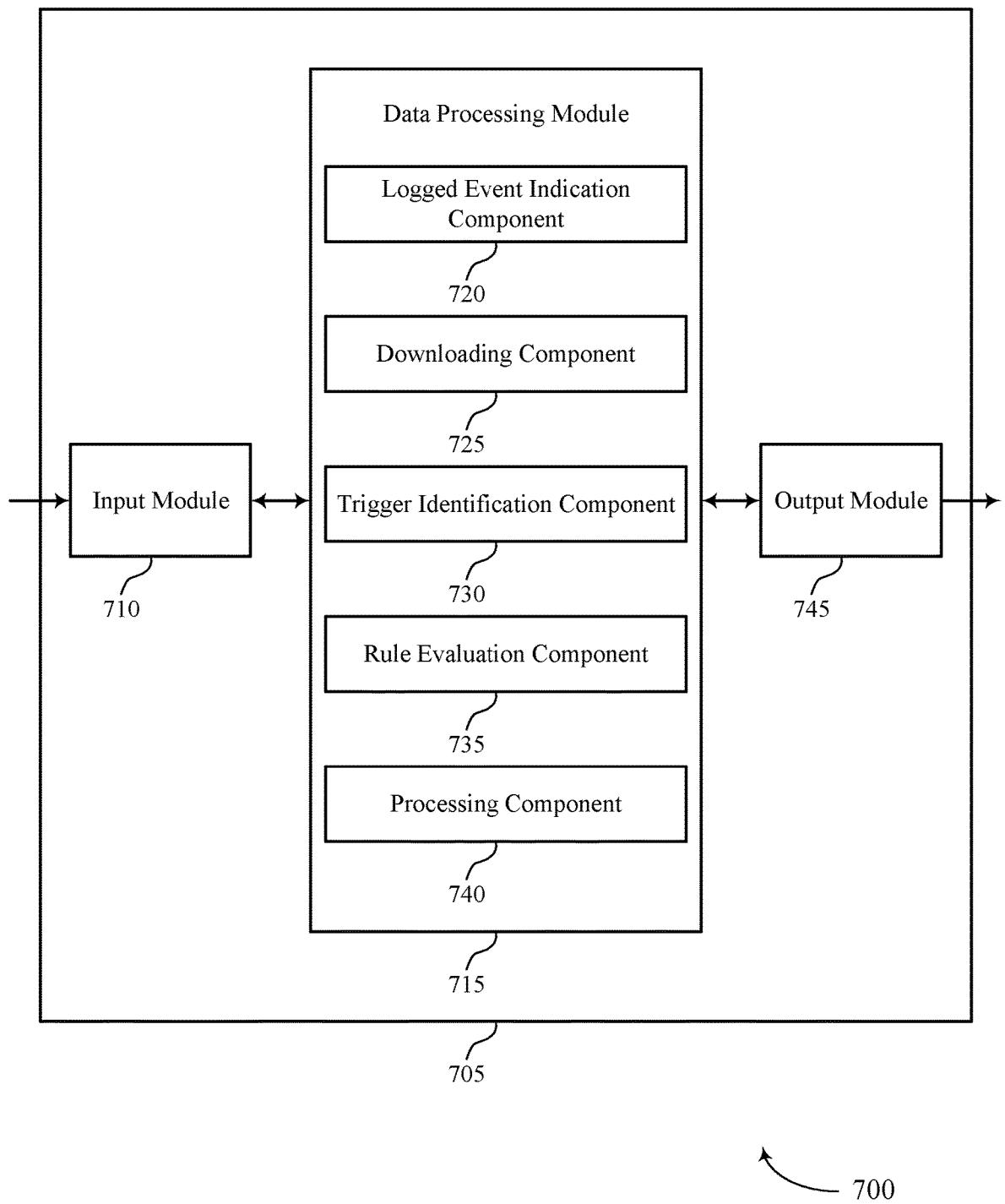
FIG. 7 shows a block diagram of an apparatus that supports rule-based dynamic command triggers in mobile applications in accordance with aspects of the present disclosure.

FIG. 7 shows a block diagram 700 of an apparatus 705 that supports rule-based dynamic command triggers in mobile applications in accordance with aspects of the present disclosure. The apparatus 705 may include an input module 710, a data processing module 715, and an output module 745. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the data processing module 715 to support Rule-Based Dynamic Command Triggers in Mobile Applications. In some cases, the input module 710 may be a component of an input/output (I/O) controller 915 as described with reference to FIG. 9.

The data processing module 715 may include a logged event indication component 720, a downloading component 725, a trigger identification component 730, a rule evaluation component 735, and a processing component 740. The data processing module 715 may be an example of aspects of the data processing module 805 or 910 described with reference to FIGS. 8 and 9.

The data processing module 715 and/or at least some of its various sub-components may be implemented in hardware, software executed by a processor, firmware, or any combination thereof. If implemented in software executed by a processor, the functions of the data processing module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing module 715 and/or at least some of its various sub-components may be physically located at various positions, including being distributed such that portions of functions are implemented at different physical locations by one or more physical devices. In some examples, the data processing module 715 and/or at least some of its various sub-components may be a separate and distinct component in accordance with various aspects of the present disclosure. In other examples, the data processing module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The logged event indication component 720 may receive, from a mobile application running on the mobile device, a logged event indication in response to an event occurring within the mobile application. The downloading component 725 may download, from an application server and before receiving the logged event indication, a data payload including a set of triggers, a set of rules associated with the set of triggers, and a set of processing commands associated with the set of rules.

The trigger identification component 730 may identify the received logged event indication as a trigger from the set of triggers. The rule evaluation component 735 may evaluate a rule associated with the trigger from the set of rules based on the identifying. The processing component 740 may process a processing command associated with the rule from the set of processing commands based on the rule, where the processing command includes utilizing native code of the mobile application.

The output module 745 may manage output signals for the apparatus 705. For example, the output module 745 may receive signals from other components of the apparatus 705, such as the data processing module 715, and may transmit these signals to other components or devices. In some specific examples, the output module 745 may transmit output signals for display in a user interface, for storage in a database or data store, for further processing at a server or server cluster, or for any other processes at any number of devices or systems. In some cases, the output module 745 may be a component of an I/O controller 915 as described with reference to FIG. 9.

Figure 8:
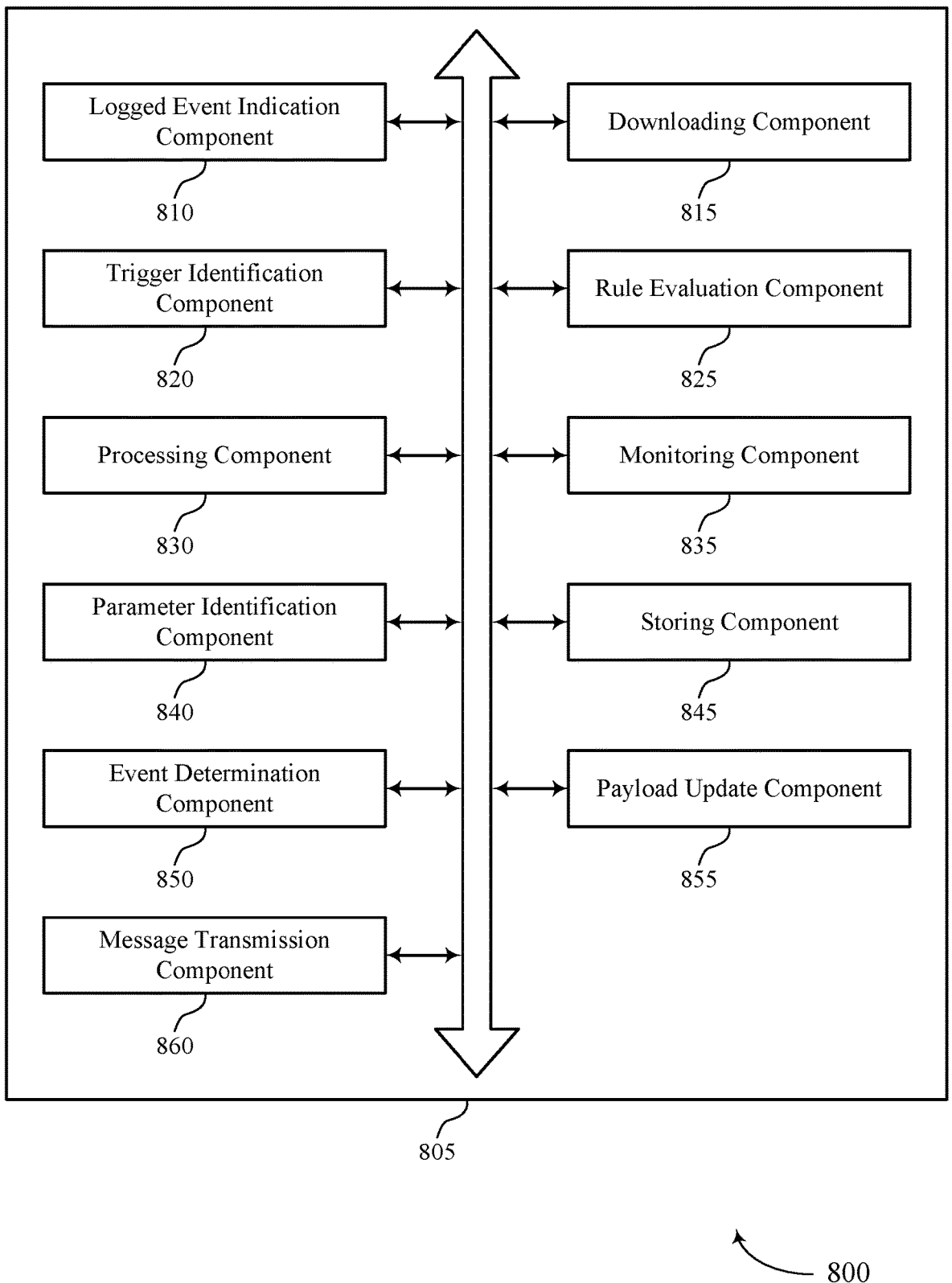
FIG. 8 shows a block diagram of a data processing module that supports rule-based dynamic command triggers in mobile applications in accordance with aspects of the present disclosure.

FIG. 8 shows a block diagram 800 of a data processing module 805 that supports rule-based dynamic command triggers in mobile applications in accordance with aspects of the present disclosure. The data processing module 805 may be an example of aspects of a data processing module 715 or a data processing module 910 described herein. The data processing module 805 may include a logged event indication component 810, a downloading component 815, a trigger identification component 820, a rule evaluation component 825, a processing component 830, a monitoring component 835, a parameter identification component 840, a storing component 845, an event determination component 850, a payload update component 855, and a message transmission component 860. Each of these modules may communicate, directly or indirectly, with one another (e.g., via one or more buses).

The logged event indication component 810 may receive, from a mobile application running on the mobile device, a logged event indication in response to an event occurring within the mobile application. The downloading component 815 may download, from an application server and before receiving the logged event indication, a data payload including a set of triggers, a set of rules associated with the set of triggers, and a set of processing commands associated with the set of rules.

In some cases, the set of triggers, the set of rules associated with the set of triggers, and the set of processing commands associated with the set of rules are not statically encoded into the mobile application. In some cases, the set of triggers, the set of rules associated with the set of triggers, and the set of processing commands associated with the set of rules are dynamically encoded into the application server by a creator associated with the mobile application.

The trigger identification component 820 may identify the received logged event indication as a trigger from the set of triggers. The rule evaluation component 825 may evaluate a rule associated with the trigger from the set of rules based on the identifying. The processing component 830 may process a processing command associated with the rule from the set of processing commands based on the rule, where the processing command includes utilizing native code of the mobile application.

In some examples, the logged event indication component 810 may receive, from the mobile application running on the mobile device, a second logged event indication prior to receiving the logged event indication. In some examples, the trigger identification component 820 may identify that the second logged event indication does not include the trigger from the set of triggers. The monitoring component 835 may monitor the mobile application running on the mobile device to identify the event occurring within the mobile application based on identifying that the second logged event indication does not include the trigger.

The parameter identification component 840 may identify one or more parameters associated with the trigger, where evaluating the rule associated with the trigger includes determining that the one or more parameters satisfy the rule. The storing component 845 may store, at the software development kit running in the mobile device, the data payload downloaded from the application server.

In some examples, the logged event indication component 810 may receive, from the mobile application running on the mobile device, an application programming interface (API) call in response to the event occurring within the mobile application, where the API call includes the logged event indication.

The event determination component 850 may determine that a second event has occurred within the mobile application after occurrence of the event. The payload update component 855 may transmit, to the application server, a request to update the data payload including the set of triggers, the set of rules associated with the set of triggers, and the set of processing commands associated with the set of rules based on the determining. In some cases, the second event includes a change of state of the mobile application from a closed state to an open state. In some cases, the second event includes identifying a use of a feature included in the mobile application.

In some examples, the rule evaluation component 825 may receive additional information from at least one of the mobile application, the mobile device, the application server, or a combination thereof. In some examples, the rule evaluation component 825 may evaluate the rule associated with the trigger based on the additional information.

The message transmission component 860 may transmit, for display within the mobile application running on the mobile device, a message. In some examples, the processing component 830 may transmit a request for a URL including one or more parameters associated with the trigger from the set of triggers. In some cases, the one or more parameters associated with the trigger includes at least one of an identifier associated with the mobile application, an identifier associated with the received logged event indication, or a combination thereof. In some examples, the processing component 830 may open a webpage associated with the mobile application based on the rule.

In some examples, the logged event indication component 810 may receive, from the mobile application running on the mobile device, a second logged event indication in response to a second event occurring within the mobile application. In some examples, the logged event indication component 810 may forward the second logged event indication to the application server based on receiving the second logged event indication.

Figure 9:
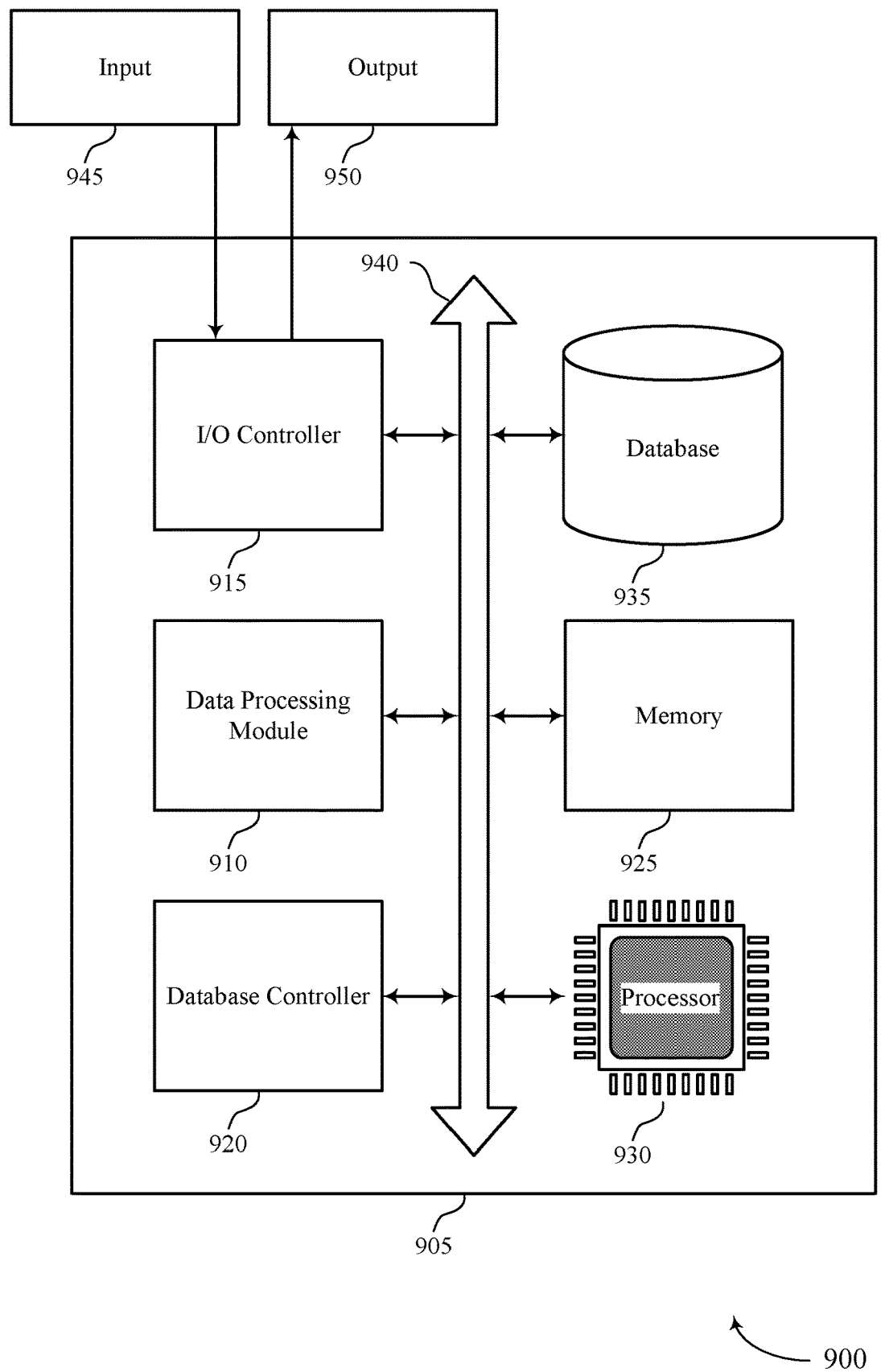
FIG. 9 shows a diagram of a system including a device that supports rule-based dynamic command triggers in mobile applications in accordance with aspects of the present disclosure.

FIG. 9 shows a diagram of a system 900 including a device 905 that supports rule-based dynamic command triggers in mobile applications in accordance with aspects of the present disclosure. The device 905 may be an example of or include the components of a user device or an apparatus 705 as described herein. The device 905 may include components for bi-directional data communications including components for transmitting and receiving communications, including a data processing module 910, an I/O controller 915, a database controller 920, memory 925, a processor 930, and a database 935. These components may be in electronic communication via one or more buses (e.g., bus 940).

The data processing module 910 may be an example of a data processing module 715 or 805 as described herein. For example, the data processing module 910 may perform any of the methods or processes described above with reference to FIGS. 7 and 8. In some cases, the data processing module 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting rule-based dynamic command triggers in mobile applications).

Figure 10:
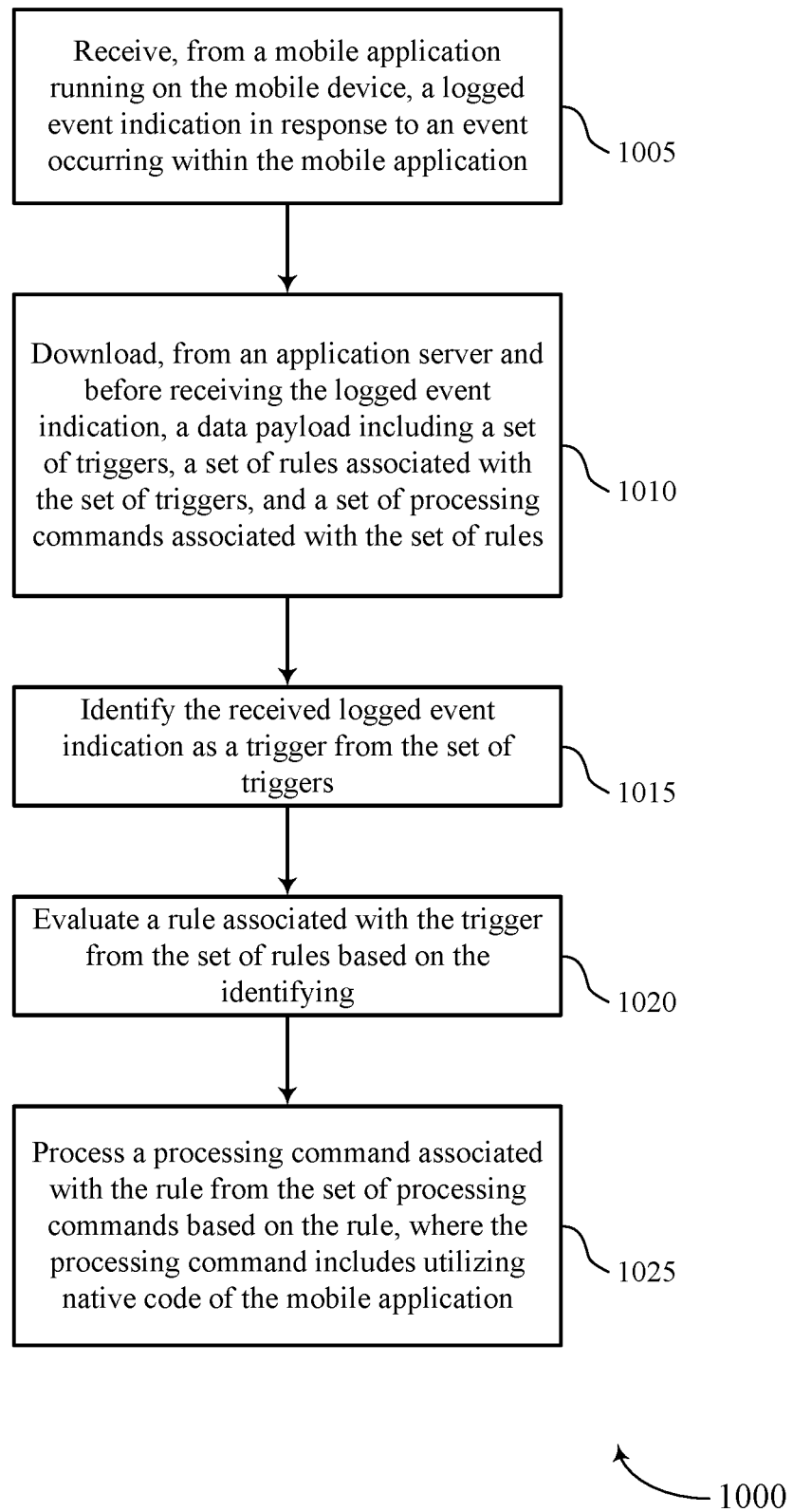
FIGS. 10 through 12 show flowcharts illustrating methods that support rule-based dynamic command triggers in mobile applications in accordance with aspects of the present disclosure.

FIG. 10 shows a flowchart illustrating a method 1000 that supports rule-based dynamic command triggers in mobile applications in accordance with aspects of the present disclosure. The operations of method 1000 may be implemented by a user device or its components as described herein. For example, the operations of method 1000 may be performed by a data processing module as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1005, the user device may receive, from a mobile application running on the mobile device, a logged event indication in response to an event occurring within the mobile application. The operations of 1005 may be performed according to the methods described herein. In some examples, aspects of the operations of 1005 may be performed by a logged event indication component as described with reference to FIGS. 7 through 9.

At 1010, the user device may download, from an application server and before receiving the logged event indication, a data payload including a set of triggers, a set of rules associated with the set of triggers, and a set of processing commands associated with the set of rules. The operations of 1010 may be performed according to the methods described herein. In some examples, aspects of the operations of 1010 may be performed by a downloading component as described with reference to FIGS. 7 through 9.

At 1015, the user device may identify the received logged event indication as a trigger from the set of triggers. The operations of 1015 may be performed according to the methods described herein. In some examples, aspects of the operations of 1015 may be performed by a trigger identification component as described with reference to FIGS. 7 through 9.

At 1020, the user device may evaluate a rule associated with the trigger from the set of rules based on the identifying. The operations of 1020 may be performed according to the methods described herein. In some examples, aspects of the operations of 1020 may be performed by a rule evaluation component as described with reference to FIGS. 7 through 9.

At 1025, the user device may process a processing command associated with the rule from the set of processing commands based on the rule, where the processing command includes utilizing native code of the mobile application. The operations of 1025 may be performed according to the methods described herein. In some examples, aspects of the operations of 1025 may be performed by a processing component as described with reference to FIGS. 7 through 9.

Figure 11:
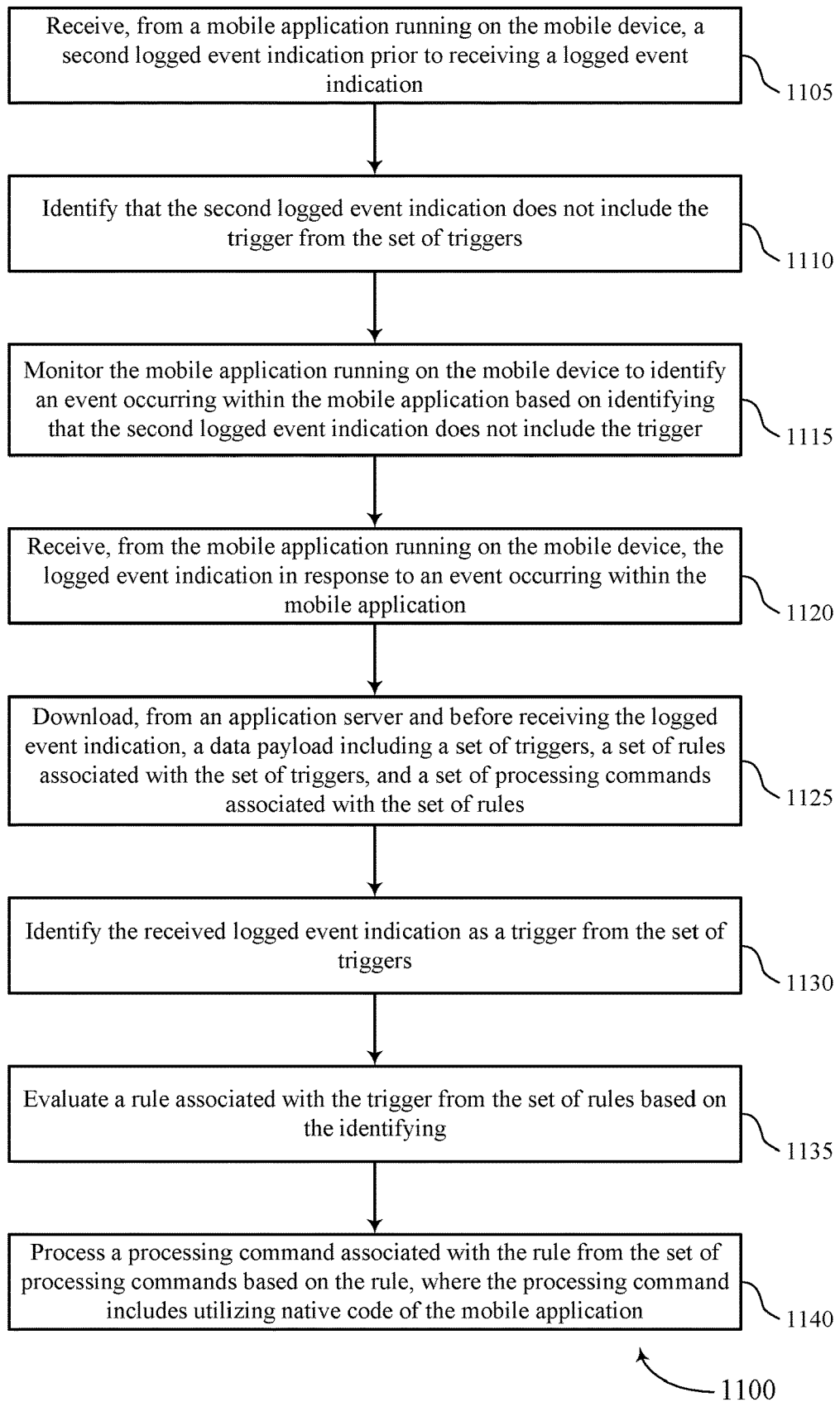

FIG. 11 shows a flowchart illustrating a method 1100 that supports rule-based dynamic command triggers in mobile applications in accordance with aspects of the present disclosure. The operations of method 1100 may be implemented by a user device or its components as described herein. For example, the operations of method 1100 may be performed by a data processing module as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1105, the user device may receive, from a mobile application running on the mobile device, a second logged event indication prior to receiving a logged event indication. The operations of 1105 may be performed according to the methods described herein. In some examples, aspects of the operations of 1105 may be performed by a logged event indication component as described with reference to FIGS. 7 through 9.

At 1110, the user device may identify that the second logged event indication does not include the trigger from the set of triggers. The operations of 1110 may be performed according to the methods described herein. In some examples, aspects of the operations of 1110 may be performed by a trigger identification component as described with reference to FIGS. 7 through 9.

At 1115, the user device may monitor the mobile application running on the mobile device to identify an event occurring within the mobile application based on identifying that the second logged event indication does not include the trigger. The operations of 1115 may be performed according to the methods described herein. In some examples, aspects of the operations of 1115 may be performed by a monitoring component as described with reference to FIGS. 7 through 9.

At 1120, the user device may receive, from the mobile application running on the mobile device, the logged event indication in response to an event occurring within the mobile application. The operations of 1120 may be performed according to the methods described herein. In some examples, aspects of the operations of 1120 may be performed by a logged event indication component as described with reference to FIGS. 7 through 9.

At 1125, the user device may download, from an application server and before receiving the logged event indication, a data payload including a set of triggers, a set of rules associated with the set of triggers, and a set of processing commands associated with the set of rules. The operations of 1125 may be performed according to the methods described herein. In some examples, aspects of the operations of 1125 may be performed by a downloading component as described with reference to FIGS. 7 through 9.

At 1130, the user device may identify the received logged event indication as a trigger from the set of triggers. The operations of 1130 may be performed according to the methods described herein. In some examples, aspects of the operations of 1130 may be performed by a trigger identification component as described with reference to FIGS. 7 through 9.

At 1135, the user device may evaluate a rule associated with the trigger from the set of rules based on the identifying. The operations of 1135 may be performed according to the methods described herein. In some examples, aspects of the operations of 1135 may be performed by a rule evaluation component as described with reference to FIGS. 7 through 9.

At 1140, the user device may process a processing command associated with the rule from the set of processing commands based on the rule, where the processing command includes utilizing native code of the mobile application. The operations of 1140 may be performed according to the methods described herein. In some examples, aspects of the operations of 1140 may be performed by a processing component as described with reference to FIGS. 7 through 9.

Figure 12:
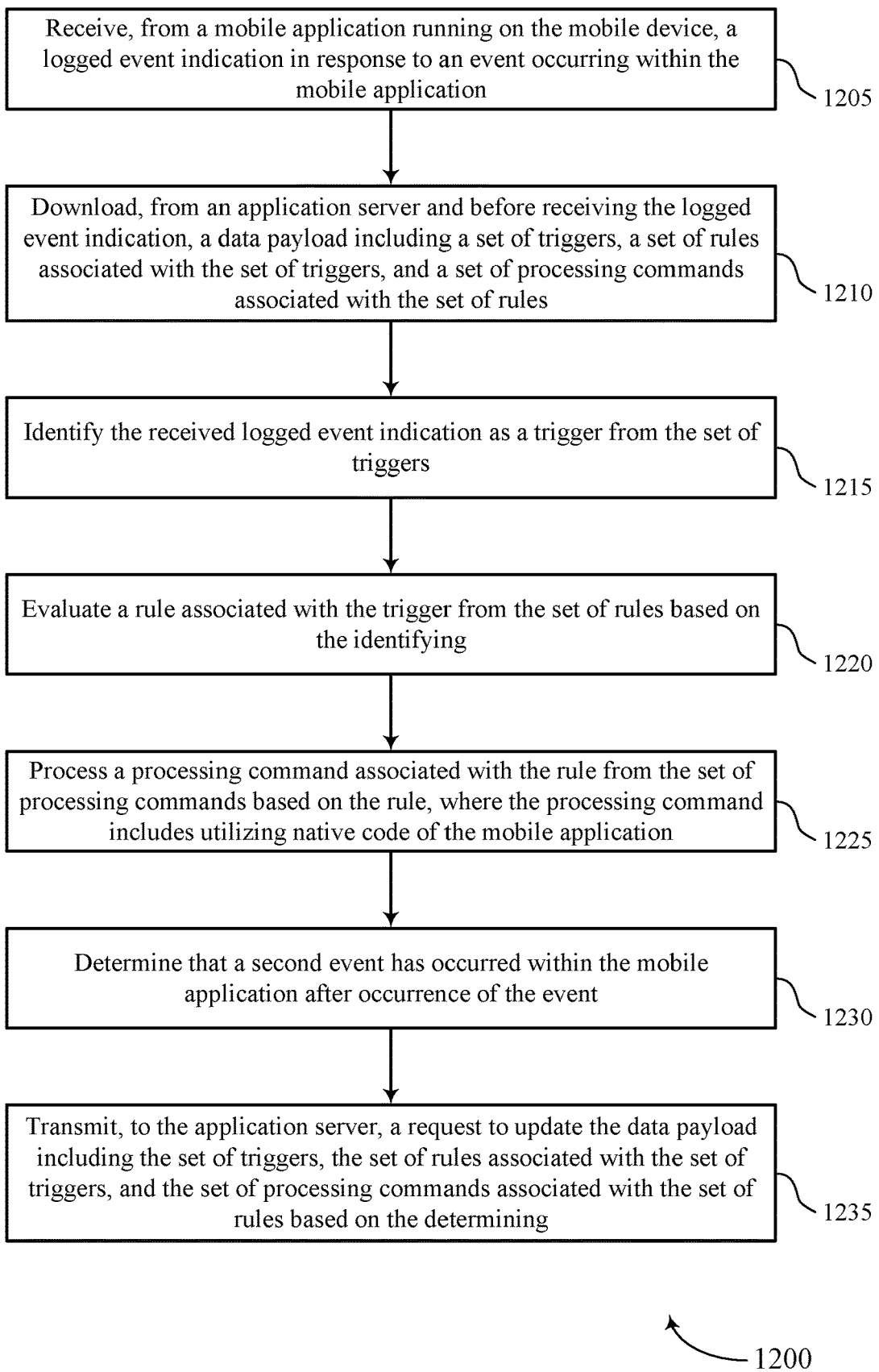

FIG. 12 shows a flowchart illustrating a method 1200 that supports rule-based dynamic command triggers in mobile applications in accordance with aspects of the present disclosure. The operations of method 1200 may be implemented by a user device or its components as described herein. For example, the operations of method 1200 may be performed by a data processing module as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1205, the user device may receive, from a mobile application running on the mobile device, a logged event indication in response to an event occurring within the mobile application. The operations of 1205 may be performed according to the methods described herein. In some examples, aspects of the operations of 1205 may be performed by a logged event indication component as described with reference to FIGS. 7 through 9.

At 1210, the user device may download, from an application server and before receiving the logged event indication, a data payload including a set of triggers, a set of rules associated with the set of triggers, and a set of processing commands associated with the set of rules. The operations of 1210 may be performed according to the methods described herein. In some examples, aspects of the operations of 1210 may be performed by a downloading component as described with reference to FIGS. 7 through 9.

At 1215, the user device may identify the received logged event indication as a trigger from the set of triggers. The operations of 1215 may be performed according to the methods described herein. In some examples, aspects of the operations of 1215 may be performed by a trigger identification component as described with reference to FIGS. 7 through 9.

At 1220, the user device may evaluate a rule associated with the trigger from the set of rules based on the identifying. The operations of 1220 may be performed according to the methods described herein. In some examples, aspects of the operations of 1220 may be performed by a rule evaluation component as described with reference to FIGS. 7 through 9.

At 1225, the user device may process a processing command associated with the rule from the set of processing commands based on the rule, where the processing command includes utilizing native code of the mobile application. The operations of 1225 may be performed according to the methods described herein. In some examples, aspects of the operations of 1225 may be performed by a processing component as described with reference to FIGS. 7 through 9.

At 1230, the user device may determine that a second event has occurred within the mobile application after occurrence of the event. The operations of 1230 may be performed according to the methods described herein. In some examples, aspects of the operations of 1230 may be performed by an event determination component as described with reference to FIGS. 7 through 9.

At 1235, the user device may transmit, to the application server, a request to update the data payload including the set of triggers, the set of rules associated with the set of triggers, and the set of processing commands associated with the set of rules based on the determining. The operations of 1235 may be performed according to the methods described herein. In some examples, aspects of the operations of 1235 may be performed by a payload update component as described with reference to FIGS. 7 through 9.

A method of data processing at a software development kit running in a mobile device is described. The method may include receiving, from a mobile application running on the mobile device, a logged event indication in response to an event occurring within the mobile application, downloading, from an application server and before receiving the logged event indication, a data payload including a set of triggers, a set of rules associated with the set of triggers, and a set of processing commands associated with the set of rules, identifying the received logged event indication as a trigger from the set of triggers, evaluating a rule associated with the trigger from the set of rules based on the identifying, and processing a processing command associated with the rule from the set of processing commands based on the rule, where the processing command includes utilizing native code of the mobile application.

An apparatus for data processing at a software development kit running in a mobile device is described. The apparatus may include a processor, memory coupled with the processor, and instructions stored in the memory. The instructions may be executable by the processor to cause the apparatus to receive, from a mobile application running on the mobile device, a logged event indication in response to an event occurring within the mobile application, download, from an application server and before receiving the logged event indication, a data payload including a set of triggers, a set of rules associated with the set of triggers, and a set of processing commands associated with the set of rules, identify the received logged event indication as a trigger from the set of triggers, evaluate a rule associated with the trigger from the set of rules based on the identifying, and process a processing command associated with the rule from the set of processing commands based on the rule, where the processing command includes utilizing native code of the mobile application.

Another apparatus for data processing at a software development kit running in a mobile device is described. The apparatus may include means for receiving, from a mobile application running on the mobile device, a logged event indication in response to an event occurring within the mobile application, downloading, from an application server and before receiving the logged event indication, a data payload including a set of triggers, a set of rules associated with the set of triggers, and a set of processing commands associated with the set of rules, identifying the received logged event indication as a trigger from the set of triggers, evaluating a rule associated with the trigger from the set of rules based on the identifying, and processing a processing command associated with the rule from the set of processing commands based on the rule, where the processing command includes utilizing native code of the mobile application.

A non-transitory computer-readable medium storing code for data processing at a software development kit running in a mobile device is described. The code may include instructions executable by a processor to receive, from a mobile application running on the mobile device, a logged event indication in response to an event occurring within the mobile application, download, from an application server and before receiving the logged event indication, a data payload including a set of triggers, a set of rules associated with the set of triggers, and a set of processing commands associated with the set of rules, identify the received logged event indication as a trigger from the set of triggers, evaluate a rule associated with the trigger from the set of rules based on the identifying, and process a processing command associated with the rule from the set of processing commands based on the rule, where the processing command includes utilizing native code of the mobile application.

Some examples of the method, apparatuses, and non-transitory computer-readable medium described herein may further include operations, features, means, or instructions for receiving, from the mobile application running on the mobile device, a second logged event indication prior to receiving the logged event indication, identifying that the second logged event indication does not include the trigger from the set of triggers, and monitoring the mobile application running on the mobile device to identify the event occurring within the mobile application based on identifying that the second logged event indication does not include the trigger.

Some examples of the method, apparatuses, and non-transitory computer-readable medium described herein may further include operations, features, means, or instructions for identifying one or more parameters associated with the trigger, where evaluating the rule associated with the trigger includes determining that the one or more parameters satisfy the rule. Some examples of the method, apparatuses, and non-transitory computer-readable medium described herein may further include operations, features, means, or instructions for storing, at the software development kit running in the mobile device, the data payload downloaded from the application server.

In some examples of the method, apparatuses, and non-transitory computer-readable medium described herein, receiving the logged event indication further may include operations, features, means, or instructions for receiving, from the mobile application running on the mobile device, an application programming interface (API) call in response to the event occurring within the mobile application, where the API call includes the logged event indication. Some examples of the method, apparatuses, and non-transitory computer-readable medium described herein may further include operations, features, means, or instructions for determining that a second event may have occurred within the mobile application after occurrence of the event, and transmitting, to the application server, a request to update the data payload including the set of triggers, the set of rules associated with the set of triggers, and the set of processing commands associated with the set of rules based on the determining.

In some examples of the method, apparatuses, and non-transitory computer-readable medium described herein, the second event includes a change of state of the mobile application from a closed state to an open state. In some examples of the method, apparatuses, and non-transitory computer-readable medium described herein, the second event includes identifying a use of a feature included in the mobile application.

In some examples of the method, apparatuses, and non-transitory computer-readable medium described herein, evaluating the rule associated with the trigger further may include operations, features, means, or instructions for receiving additional information from at least one of the mobile application, the mobile device, the application server, or a combination thereof, and evaluating the rule associated with the trigger based on the additional information. In some examples of the method, apparatuses, and non-transitory computer-readable medium described herein, processing the processing command associated with the rule further may include operations, features, means, or instructions for transmitting, for display within the mobile application running on the mobile device, a message.

In some examples of the method, apparatuses, and non-transitory computer-readable medium described herein, processing the processing command associated with the rule further may include operations, features, means, or instructions for transmitting a request for a URL including one or more parameters associated with the trigger from the set of triggers. In some examples of the method, apparatuses, and non-transitory computer-readable medium described herein, the one or more parameters associated with the trigger includes at least one of an identifier associated with the mobile application, an identifier associated with the received logged event indication, or a combination thereof.

In some examples of the method, apparatuses, and non-transitory computer-readable medium described herein, processing the processing command associated with the rule further may include operations, features, means, or instructions for opening a webpage associated with the mobile application based on the rule. Some examples of the method, apparatuses, and non-transitory computer-readable medium described herein may further include operations, features, means, or instructions for receiving, from the mobile application running on the mobile device, a second logged event indication in response to a second event occurring within the mobile application, and forwarding the second logged event indication to the application server based on receiving the second logged event indication.

In some examples of the method, apparatuses, and non-transitory computer-readable medium described herein, the set of triggers, the set of rules associated with the set of triggers, and the set of processing commands associated with the set of rules may not be statically encoded into the mobile application. In some examples of the method, apparatuses, and non-transitory computer-readable medium described herein, the set of triggers, the set of rules associated with the set of triggers, and the set of processing commands associated with the set of rules may be dynamically encoded into the application server by a creator associated with the mobile application.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a software development kit (SDK) running in a mobile device, comprising:
   receiving, at the SDK and from a mobile application running on the mobile device, a first logged event indication in response to an event occurring within the mobile application, wherein the event is associated with an user action in the mobile application;
   downloading, at the SDK and from an application server, and before receiving the first logged event indication, a data payload comprising a set of triggers, a set of rules associated with the set of triggers, and a set of outcomes associated with the set of rules;
   identifying, at the SDK, the received logged event indication as a trigger from the set of triggers;
   evaluating, at the SDK, a rule associated with the trigger from the set of rules based at least in part on the identifying;
   processing, by the SDK, an outcome from the set of outcomes based at least in part on the rule, wherein the outcome utilizes native code of the mobile application;
   receiving, from the mobile application running on the mobile device, a second logged event indication prior to receiving the first logged event indication;
   identifying that the second logged event indication does not comprise the trigger from the set of triggers; and
   monitoring the mobile application running on the mobile device to identify the event occurring within the mobile application based at least in part on identifying that the second logged event indication does not comprise the trigger.

2. The method of claim 1, further comprising:
   identifying one or more parameters associated with the trigger, wherein evaluating the rule associated with the trigger comprises determining that the one or more parameters satisfy the rule.

3. The method of claim 1, further comprising:
   storing, at the software development kit running in the mobile device, the data payload downloaded from the application server.

4. The method of claim 1, wherein receiving the first logged event indication further comprises:
   receiving, from the mobile application running on the mobile device, an application programming interface (API) call in response to the event occurring within the mobile application, wherein the API call comprises the first logged event indication.

5. The method of claim 1, further comprising:
   determining that a second event has occurred within the mobile application after occurrence of the event; and
   transmitting, to the application server, a request to update the data payload comprising the set of triggers, the set of rules associated with the set of triggers, and the set of outcomes associated with the set of rules based at least in part on the determining.

6. The method of claim 5, wherein the second event comprises a change of state of the mobile application from a closed state to an open state.

7. The method of claim 5, wherein the second event comprises identifying a use of a feature included in the mobile application.

8. The method of claim 1, wherein evaluating the rule associated with the trigger further comprises:
   receiving additional information from at least one of the mobile application, the mobile device, the application server, or a combination thereof; and
   evaluating the rule associated with the trigger based at least in part on the additional information.

9. The method of claim 1, wherein processing the outcome associated with the rule further comprises:
   transmitting, for display within the mobile application running on the mobile device, a message.

10. The method of claim 1, wherein processing the outcome associated with the rule further comprises:
    transmitting a request for a uniform resource locator (URL) including one or more parameters associated with the trigger from the set of triggers.

11. The method of claim 10, wherein the one or more parameters associated with the trigger comprises at least one of an identifier associated with the mobile application, an identifier associated with the received logged event indication, or a combination thereof.

12. The method of claim 1, wherein processing the outcome associated with the rule further comprises:
    opening a webpage associated with the mobile application based at least in part on the rule.

13. The method of claim 1, further comprising:
receiving, from the mobile application running on the mobile device, a third logged event indication in response to a second event occurring within the mobile application; and
forwarding the third logged event indication to the application server based at least in part on receiving the third logged event indication.

14. The method of claim 1, wherein the set of triggers, the set of rules associated with the set of triggers, and the set of outcomes associated with the set of rules are not statically encoded into the mobile application.

15. The method of claim 1, wherein the set of triggers, the set of rules associated with the set of triggers, and the set of outcomes associated with the set of rules are dynamically encoded into the application server by a creator associated with the mobile application.

16. An apparatus for data processing at a software development kit (SDK) running in a mobile device, comprising: a processor, memory coupled with the processor; and instructions stored in the memory and executable by the processor to cause the apparatus to:
receive, at the SDK and from a mobile application running on the mobile device, a first logged event indication in response to an event occurring within the mobile application, wherein the event is associated with an user action in the mobile application;
download, at the SDK and from an application server, and before receiving the first logged event indication, a data payload comprising a set of triggers, a set of rules associated with the set of triggers, and a set of outcomes associated with the set of rules;
identify, at the SDK, the received logged event indication as a trigger from the set of triggers;
evaluate, at the SDK, a rule associated with the trigger from the set of rules based at least in part on the identifying;
process, by the SDK, an outcome from the set of outcomes based at least in part on the rule, wherein the outcome utilizes native code of the mobile application;
receive, from the mobile application running on the mobile device, a second logged event indication prior to receiving the first logged event indication;
identify that the second logged event indication does not comprise the trigger from the set of triggers; and
monitor the mobile application running on the mobile device to identify the event occurring within the mobile application based at least in part on identifying that the second logged event indication does not comprise the trigger.

17. The apparatus of claim 16, wherein the instructions are further executable by the processor to cause the apparatus to:
identify one or more parameters associated with the trigger, wherein evaluating the rule associated with the trigger are executable by the processor to cause the apparatus to determine that the one or more parameters satisfy the rule.

18. A non-transitory computer-readable medium storing code for data processing at a software development kit (SDK) running in a mobile device, the code comprising instructions executable by a processor to:
receive, at the SDK and from a mobile application running on the mobile device, a first logged event indication in response to an event occurring within the mobile application, wherein the event is associated with an user action in the mobile application;
download, at the SDK and from an application server and before receiving the first logged event indication, a data payload comprising a set of triggers, a set of rules associated with the set of triggers, and a set of outcomes associated with the set of rules;
identify, at the SDK, the received logged event indication as a trigger from the set of triggers;
evaluate, at the SDK, a rule associated with the trigger from the set of rules based at least in part on the identifying;
process, at the SDK, an outcome from the set of outcomes based at least in part on the rule, wherein the outcome utilizes native code of the mobile application;
receive, from the mobile application running on the mobile device, a second logged event indication prior to receiving the first logged event indication;
identify that the second logged event indication does not comprise the trigger from the set of triggers; and
monitor the mobile application running on the mobile device to identify the event occurring within the mobile application based at least in part on identifying that the second logged event indication does not comprise the trigger.

\* \* \* \* \*